United States Patent
Mishra et al.

(10) Patent No.: US 10,572,438 B1
(45) Date of Patent: Feb. 25, 2020

(54) DYNAMIC OPTIMAL DATA SAMPLING TIME ON A MULTI-DROP BUS

(71) Applicant: QUALCOMM Incorporated, San Diego, CA (US)

(72) Inventors: Lalan Jee Mishra, San Diego, CA (US); Richard Dominic Wietfeldt, San Diego, CA (US); Christopher Kong Yee Chun, Austin, TX (US); Radu Pitigoi-Aron, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/295,046

(22) Filed: Mar. 7, 2019

(51) Int. Cl.
| | |
|---|---|
| *G06F 13/42* | (2006.01) |
| *G06F 1/10* | (2006.01) |
| *H04L 12/40* | (2006.01) |
| *H04L 12/403* | (2006.01) |
| *G06F 1/12* | (2006.01) |
| *G06F 1/08* | (2006.01) |

(52) U.S. Cl.
CPC ........... *G06F 13/4291* (2013.01); *G06F 1/08* (2013.01); *G06F 1/10* (2013.01); *G06F 1/12* (2013.01); *H04L 12/403* (2013.01); *H04L 12/40019* (2013.01); *G06F 2213/0016* (2013.01)

(58) Field of Classification Search
CPC ..... G06F 1/04; G06F 1/08; G06F 1/10; G06F 1/12; G06F 13/4291; G06F 2213/0016
See application file for complete search history.

(56) References Cited

U.S. PATENT DOCUMENTS

| | | | |
|---|---|---|---|
| 2015/0199295 A1* | 7/2015 | Sengoku | G06F 13/4234 710/110 |
| 2018/0275713 A1* | 9/2018 | Srivastava | G06F 13/4291 |
| 2018/0293196 A1* | 10/2018 | Srivastava | G06F 13/364 |
| 2018/0365188 A1* | 12/2018 | Srivastava | G06F 13/4086 |
| 2019/0004991 A1* | 1/2019 | Foust | G06F 13/4291 |
| 2019/0129464 A1* | 5/2019 | Graif | G06F 1/08 |
| 2019/0171589 A1* | 6/2019 | Mishra | G06F 13/161 |
| 2019/0238362 A1* | 8/2019 | Mishra | G06F 13/4291 |

* cited by examiner

*Primary Examiner* — Glenn A. Auve
(74) *Attorney, Agent, or Firm* — Loza & Loza LLP

(57) ABSTRACT

Systems, methods, and apparatus for improving end-to-end timing closure of a serial bus are described. An apparatus is coupled to a serial bus through an interface circuit and has a clock generator that provides a first clock signal, a delay circuit that is adapted to generate a second clock signal by delaying the first clock signal, and a controller that is configured to cause the interface circuit to use an edge of the first clock signal to initiate transmission of a first data bit over the serial bus during a write operation, delay the first clock signal to obtain a second clock signal, and cause the interface circuit to use an edge of the second clock signal to capture a second data bit from the serial bus during a read operation. The edge of the second clock signal is delayed with respect to the edge of the first clock signal.

28 Claims, 21 Drawing Sheets

DYNAMIC OPTIMAL DATA SAMPLING TIME ON A MULTI-DROP BUS

TECHNICAL FIELD

The present disclosure relates generally to serial communication over a shared serial bus and, more particularly, to optimizing data transfers over the shared serial bus.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a serial bur or a parallel bus. General-purpose serial interfaces known in the industry, including the Inter-Integrated Circuit (I2C or I²C) serial bus and its derivatives and alternatives, including interfaces defined by the Mobile Industry Processor Interface (MIPI) Alliance, such as I3C and the Radio Frequency Front-End (RFFE) interface.

In one example, the I3C serial bus is a serial bus that was intended for use in connecting sensors and other peripherals to a processor. In some implementations, multiple bus masters are coupled to the serial bus such that two or more devices can serve as bus master for different messages transmitted on the serial bus. In another example, the RFFE, interface defines a communication interface for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communications device, multiple antennas and radio transceivers may support multiple concurrent RF links. In another example, system power management interface (SPMI) defined by the MIPI Alliance provides a hardware interface that may be implemented between baseband or application processors and peripheral components. In some implementations, the SPMI is deployed to support power management operations within a device.

In many instances, a multi-drop serial interface may be provided to support high-priority, low-latency communication between an application processor and certain peripherals, and other lower-priority communication. Latency can be adversely affected when multiple devices coupled to the serial bus are concurrently active. Degraded latencies can lead to an increase in dropped packets, session timeouts and retransmissions on the serial bus. As mobile communication devices continue to include a greater level of functionality, improved serial communication techniques are needed to improve latencies and/or handling of priority traffic on a serial bus that couples peripherals and application processors.

SUMMARY

Certain aspects of the disclosure relate to systems, apparatus, methods and techniques that can support increased data rates for a serial bus without increasing bus clock frequency and without modifying encoding of the data transmitted on the data line.

In various aspects of the disclosure, a method performed at a device coupled to a serial bus includes providing a first clock signal for transmission over a serial bus, using an edge of the first clock signal to initiate transmission of a first data bit over the serial bus during a write operation, delaying the first clock signal to obtain a second clock signal, and using an edge of the second clock signal to capture a second data bit from the serial bus during a read operation. The edge of the second clock signal may be delayed with respect to the edge of the first clock signal.

In certain aspects, delaying the first clock signal includes configuring a delay between the edge of the first clock signal and the edge of the second clock signal to accommodate latencies associated with transmission of data bits by a slave device during the read operation, the latencies including one or more latencies associated with a propagation delay. The delay between the edge of the first clock signal and the edge of the second clock signal includes a coarse delay including one or more half-cycles of the first clock signal. The delay between the edge of the first clock signal and the edge of the second clock signal includes a fractional delay having a duration that is less than one cycle of the first clock signal.

In certain aspects, delaying the first clock signal includes determining an operating condition affecting transmissions over the serial bus, and configuring a delay circuit based on the operating condition. The operating condition may relate to a process variable, an operating voltage or an operating temperature.

In certain aspects, delaying the first clock signal includes determining an operating condition affecting transmissions over the serial bus, using the operating condition to select a delay value from a lookup table, using the delay value to configure a delay circuit that provides the second clock signal. The lookup table may maintain delay values for a plurality of different operating conditions. The delay values maintained by the lookup table may be derived from a characterization of one or more transmission paths between two devices participating in the read operation.

In certain aspects, the method includes determining a read delay based on a time elapsed between one or more edges in the first clock signal and corresponding transitions in a data signal received from a slave device, and configuring a delay circuit to accommodate the read delay. The delay circuit may delay the first clock signal to obtain a second clock signal. Determining the read delay may include transmitting a read command, and measuring time elapsed between end of transmission of the read command and an acknowledgement signaled by the slave device responsive to the read command.

In various aspects of the disclosure, an apparatus has an interface circuit adapted to couple the apparatus to a serial bus, a clock generator configured to provide a first clock signal for transmission over the serial bus by the interface circuit, a delay circuit that is adapted to generate a second clock signal by delaying the first clock signal, and a controller that is configured to cause the interface circuit to use an edge of the first clock signal to initiate transmission of a first data bit over the serial bus during a write operation, delay the first clock signal to obtain a second clock signal, and cause the interface circuit to use an edge of the second clock signal to capture a second data bit from the serial bus during a read operation. The edge of the second clock signal is delayed with respect to the edge of the first clock signal.

In an aspect of the disclosure, a processor readable storage medium includes code for providing a first clock signal for transmission over a serial bus, using an edge of the first clock signal to initiate transmission of a first data bit over the serial bus during a write operation, delaying the first clock signal to obtain a second clock signal, and using an edge of the second clock signal to capture a second data bit from the serial bus during a read operation. The edge of the second clock signal may be delayed with respect to the edge of the first clock signal.

In an aspect of the disclosure, an apparatus coupled to a serial bus has means for providing a first clock signal for transmission over a serial bus, means for delaying the first clock signal to obtain a second clock signal, and means for initiating transmission of data over the serial bus. The means for initiating transmission of data over the serial bus is configured to use an edge of the first clock signal to initiate transmission of a first data bit over the serial bus during a write operation, and use an edge of the second clock signal to capture a second data bit from the serial bus during a read operation. The edge of the second clock signal may be delayed with respect to the edge of the first clock signal. The edge of the second clock signal may be delayed with respect to the edge of the first clock signal to accommodate delays in initiating transmission of data bits during the read operation, including one or more propagation delays.

DETAILED DESCRIPTION

Figure 1:
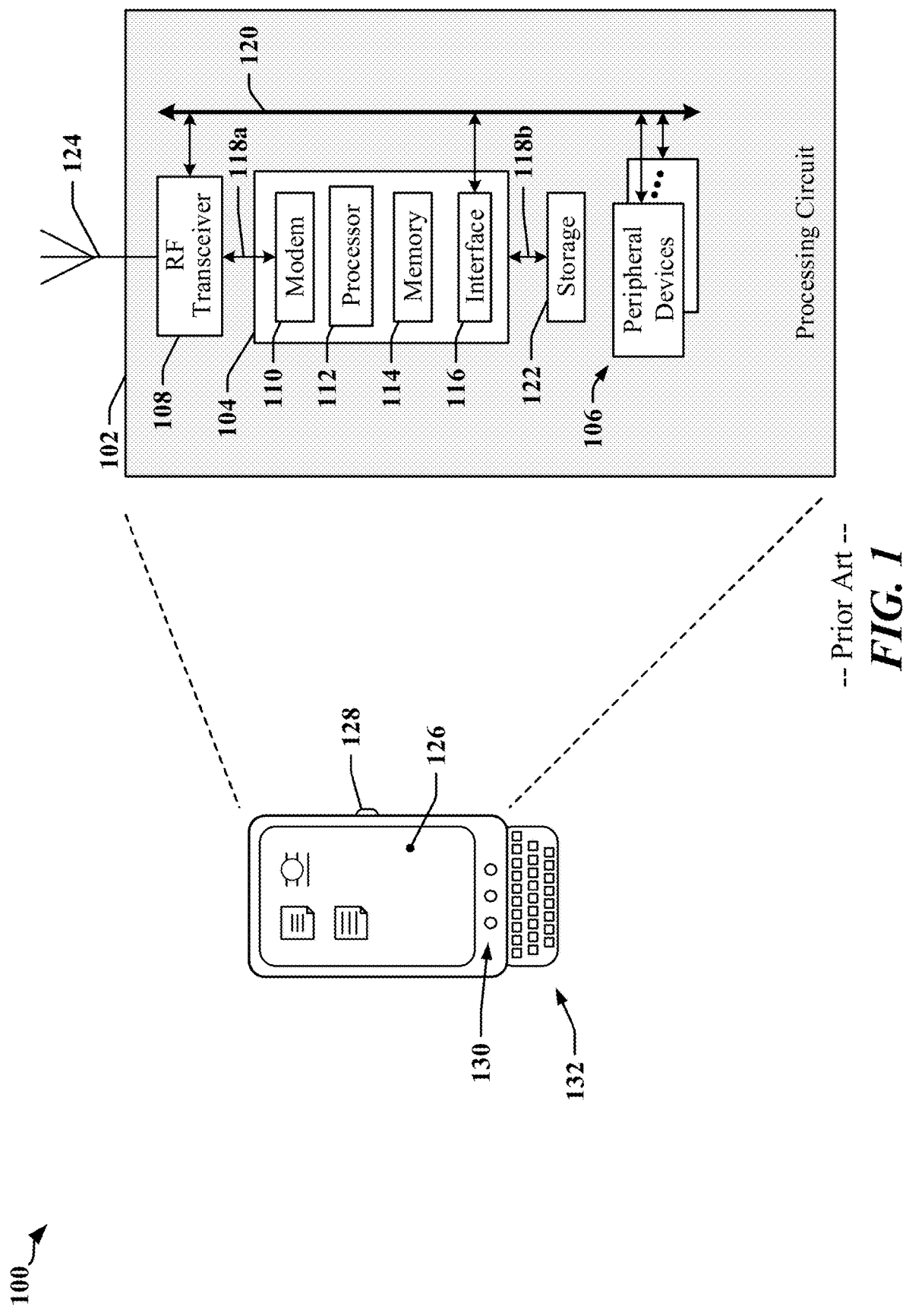
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. In certain examples disclosed herein, the serial bus may be operated in accordance with an I2C, I3C, SPMI, and/or RFFE protocol, which may be defined and/or configured for half-duplex operation. Increased utilization of serial buses, and/or the imposition of more stringent timing constraints in support of applications, peripherals and sensors can result in demand for improved data decoding techniques and reduced transmission latencies. Data decoding issues can arise when propagation delays affect clock signals used to determine sampling points in high data rate applications. Transmission latency may include the time required to terminate a transaction in process on the serial bus, bus turnaround (between transmit mode and receive mode), bus arbitration and/or command transmissions specified by protocol.

Uncertainty in sampling edges of clock signals and high bus latency can limit the capabilities and functionality of a serial bus in certain applications. For example, bus latency may limit the number and/or type of radio frequency (RF) devices that can be coupled by an RFFE bus or SPMI bus. In some examples, multiple serial buses may be implemented to enable RF devices or other low-latency devices to communicate within tight time constraints, including where bus throughput, utilization and/or other operating characteristics are otherwise easily supported by a single bus.

According to certain aspects disclosed herein, a first clock signal may be provided for transmission over a clock lane of a serial bus. A first edge in the first clock signal may be used to control initiation of transmission of a first data bit over the serial bus during a write operation. The first edge may correspond to a first type of transition a first type of transition of the first clock signal. The first type of transition may be a rising edge in a first example, or may be a falling edge in a second example. A second edge of a second signal may be to capture a second data bit from the serial bus during a read operation, where the second edge is delayed with respect to the first edge. The second edge may also be of the first type of transition.

Certain aspects disclosed herein may be applicable to a serial bus operated in accordance with an I2C, I3C, SPMI, and/or RFFE protocol, or other protocol. Certain aspects are applicable to a serial bus operated in half-duplex mode or full-duplex mode. Certain aspects are applicable to protocols where a data can be sampled on a rising edge, falling edge and/or both rising and falling edges of a clock signal transmitted over the serial bus. Certain aspects are applicable to point-to-point interfaces including UART-based interfaces, line multiplexed UART (LM-UART) interfaces, and virtual GPIO (VGI) and messaging interfaces. Certain aspects are applicable to multipoint interfaces and/or interfaces operated in point-to-point mode.

Examples Of Apparatus That Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processor-readable storage 122 may be implemented using transitory and/or non-transitory media. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with standards-based and/or proprietary communication specifications or protocols. The processing circuit 102 may include or control a power management function that configures and manages the operation of the apparatus 100.

Figure 2:
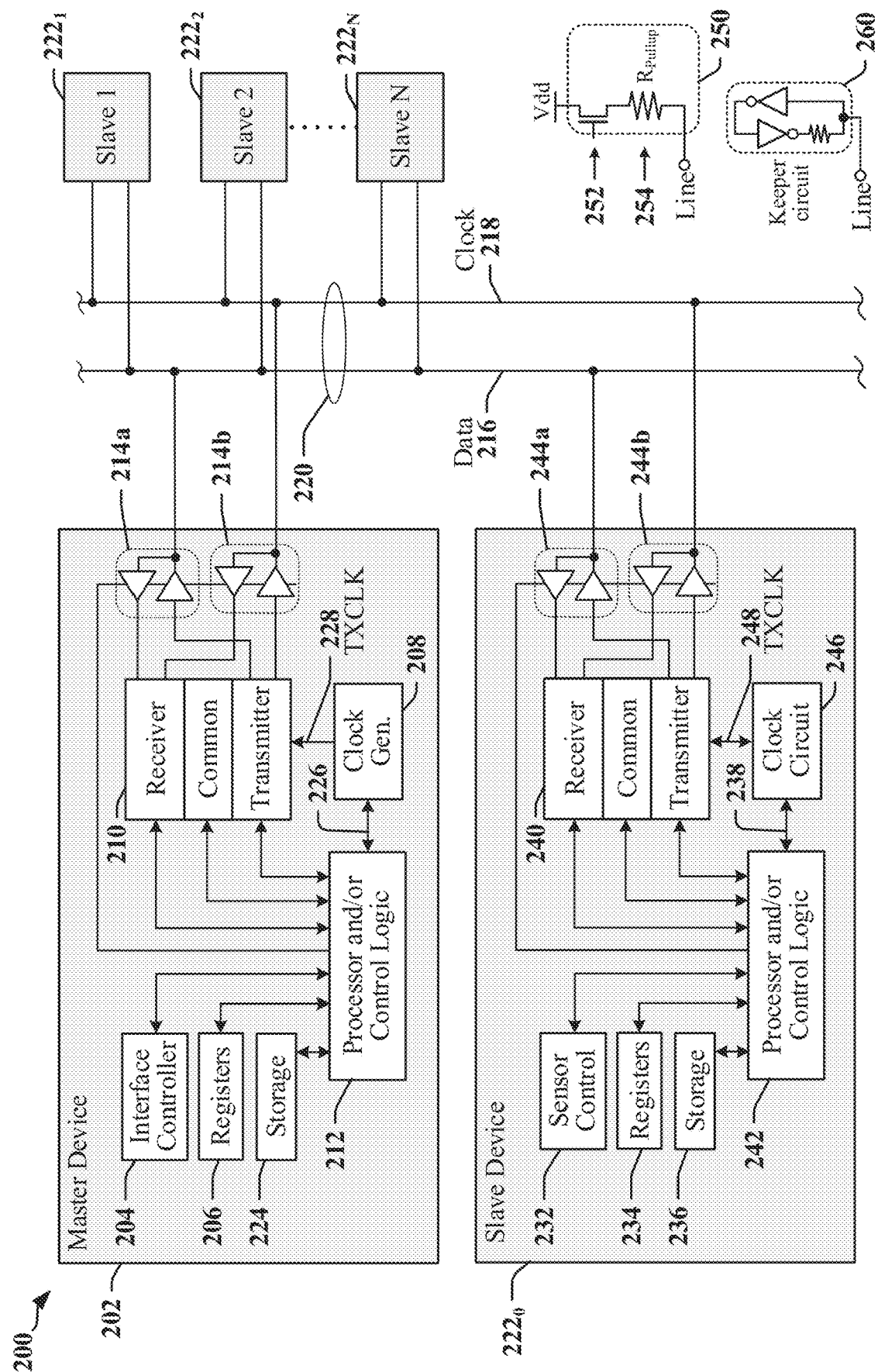
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an applications processor, SoC or ASIC. In various implementations, the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communications between devices 202 and $222_0$-$222_N$ over the serial bus 220 is controlled by a bus master device 202. Certain types of bus can support multiple bus master devices 202.

In one example, a bus master device 202 may include an interface controller 204 that may manage access to the serial bus, configure dynamic addresses for slave devices $222_0$-$222_N$ and/or generate a clock signal 228 to be transmitted on a clock line 218 of the serial bus 220. The bus master device 202 may include configuration registers 206 or other storage 224, and other control logic 212 configured to handle protocols and/or higher-level functions. The control logic 212 may include a processing circuit such as a state machine, sequencer, signal processor or general-purpose processor. The bus master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clock signals 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits or modules operable to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clock signals 238 may be used by the control logic 242 and other functions, circuits or modules.

The serial bus 220 may be operated in accordance with RFFE, I2C, I3C, SPMI, or other protocols. At least one device 202, $222_0$-$222_N$ may be configured to operate as a master device and a slave device on the serial bus 220. Two or more devices 202, $222_0$-$222_N$ may be configured to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

Pull-up circuits or structures may be coupled to the data line 216 and/or the clock line 218 to maintain the signaling state of the serial bus 220 when no device is actively driving the data line 216 and/or the clock line 218, including during line turnaround when a first device ceases driving the data line 216 and/or the clock line 218 and before a second device begins actively driving the data line 216 and/or the clock line 218. The pull-up circuits or structures may be implemented using a variety of circuits. In one example, a pull-up circuit 250 includes a pull-up resistor 254 that may be coupled to a source of higher voltage ($V_{dd}$) through a switch 252. In some instances, the switch 252 may be implemented as a suitably configured transistor. In some instances, the pull-up resistor 254 may be coupled directly to $V_{dd}$ and the switch 252 couples the pull-up structure to the data line 216 or the clock line 218. In another example, the pull-up circuits or structures may be implemented using a keeper circuit 260. The keeper circuit 260 may be configured as a positive feedback circuit that drives the data line 216 and/or the clock line 218 through a high impedance output, and receives feedback from the data line 216 and/or the clock line 218 through a low impedance input. The keeper circuit 260 may be configured to maintain the last asserted signaling state on the data line 216 and/or the clock line 218. The output of the keeper circuit 260 can be easily overcome by line drivers in the master device 202 or a slave device $222_0$-$222_N$.

Figure 3:
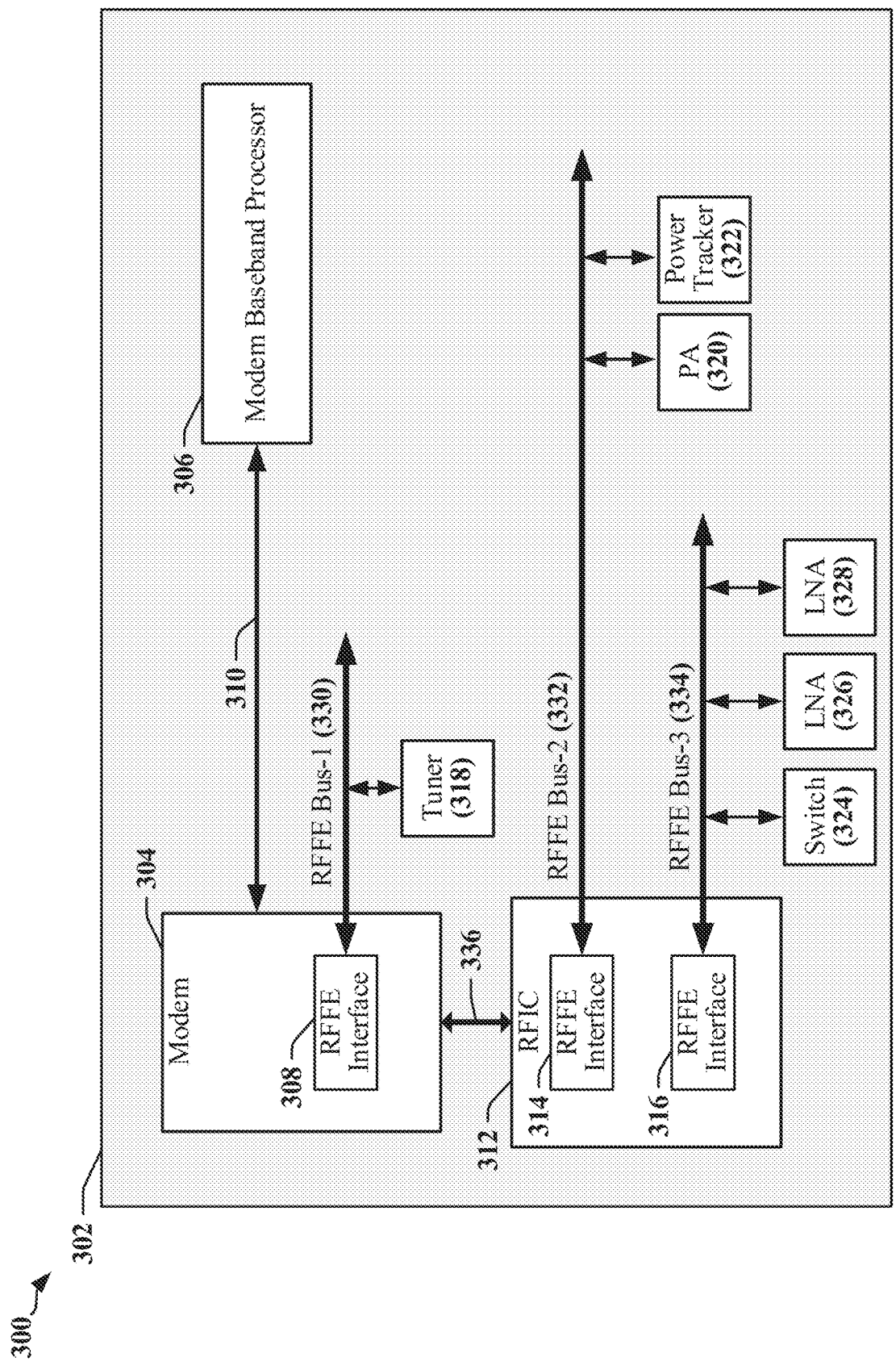
FIG. 3 illustrates a device configuration for coupling various radio frequency front-end devices using multiple RFFE buses.

FIG. 3 is a block diagram 300 illustrating a second example of a chipset or device 302 that includes communication links Here, the chipset or device 302 employs multiple RFFE, buses 330, 332, 334 to couple various RF front-end devices 318, 320, 322, 324, 326 328. In one example, a modem 304 includes an RFFE interface 308 that couples the modem 304 to a first RFFE bus 330. The modem 304 may communicate with a baseband processor 306 and an RFIC 312 through one or more communication links 310, 336. The illustrated device 302 may be embodied in one or more of a mobile communication device, a mobile telephone, a mobile computing system, a mobile telephone, a notebook computer, a tablet computing device, a media player, a gaming device, a wearable computing and/or communications device, an appliance, or the like.

In various examples, the chipset or device 302 may be implemented with one or more baseband processors 306, modems 304, RFICs 312, multiple communications links 310, 336, multiple RFFE buses 330, 332, 334 and/or other types of buses. The chipset or device 302 may include other processors, circuits, modules and may be configured for various operations and/or different functionalities. In the example illustrated in FIG. 3, the Modem is coupled to an RF tuner 318 through its RFFE interface 308 and the first RFFE bus 330. The RFIC 312 may include one or more RFFE interfaces 314, 316, controllers, state machines and/or processors that configure and control certain aspects of the RF front-end. The RFIC 312 may communicate with a PA 320 and a power tracking module 322 through a first of its RFFE interfaces 314 and the second RFFE bus 332. The RFIC 312 may communicate with a switch 324 and one or more LNAs 326, 328.

Figure 4:
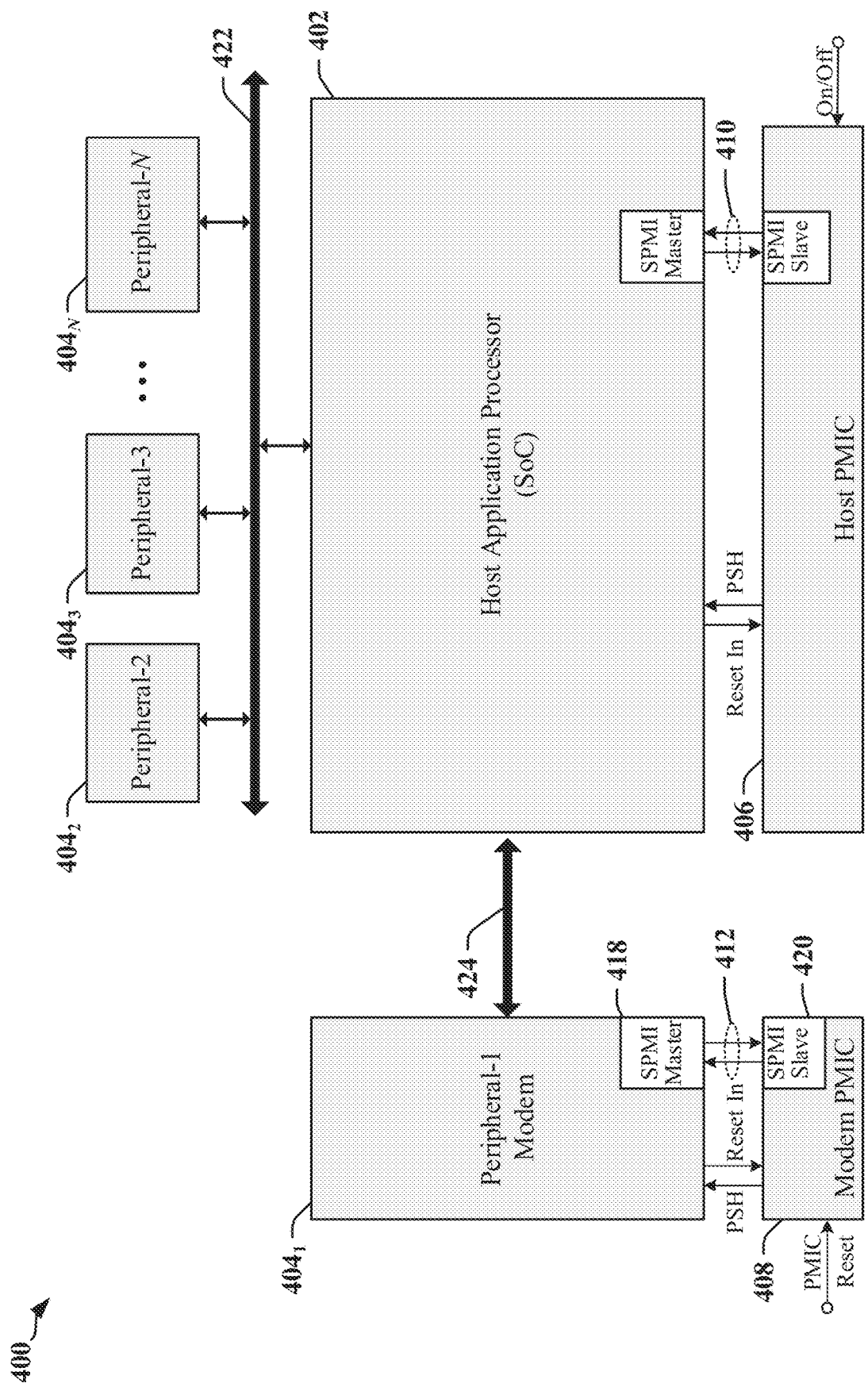
FIG. 4 illustrates a device that employs an SPMI bus to couple various devices in accordance with certain aspects disclosed herein.

The MIPI Alliance system power management interface (SPMI) specifies a hardware interface that may be implemented between baseband or application processors and peripheral components to support a variety of data communication functions including data communication related to power management operations. FIG. 4 illustrates an example of a system 400 which includes two data communication links 410, 412, where each data communication link 410, 412 is configured as a two-wire serial bus operated in accordance with SPMI protocols. In one example, a first data communication link 410 may be used to connect an integrated power controller of an application processor 402 with a voltage regulation system in a first power management integrated circuit (PMIC 406), and a second data communication link 412 may be used to connect an integrated power controller of a modem $404_1$ with a voltage regulation system in a second PMIC 408. The data communication links 410, 412 can be used to accurately monitor and control processor performance levels required for a given workload or application and dynamically control the various supply voltages in real time based on the performance levels. The data communication links 410, 412 can be used to carry other types of data between the application processor 402 and the first PMIC 406 and/or between the modem $404_1$ and the second PMIC 408. SPMI data communication links may be implemented as multi-drop serial links to connect a variety of different devices and to carry other types of data. Some SPMI data communication links may be optimized for real-time power management functions. Some SPMI data communication links may be may be used as a shared bus that provides high-speed, low-latency connection for devices, where data transmissions may be managed, according to priorities assigned to different traffic classes.

In the system 400 illustrated in FIG. 4, the application processor 402 that may serve as a host device on various data communication links 410, 422, 424, multiple peripherals $404_1$-$404_N$, and one or more PMICs 406. The application processor 402 and the modem $404_1$ may be coupled to respective PMICs 406, 408 using power management interfaces implemented using SPMI masters 414, 418. The SPMI masters 414, 418 communicate with corresponding SPMI slaves 416, 420 provided in the PMICs 406, 408 to facilitate real-time control of the PMICs 406, 408. The application processor 402 may be coupled to each of the peripherals $404_1$-$404_N$ using different types of data communication links 422, 424. For example, the data communication links 422, 424 may be operated in accordance with protocols such as the RFFE, SPMI, I3C protocols.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a transaction in process on the serial bus, the time to transmit commands causing bus turnaround between transmit mode and receive mode, bus arbitration and/or command transmissions specified by protocol.

Bus latency may be reduced by increasing data throughput for the serial bus. In one example, data throughput may be increased by increasing the frequency of the clock signal transmitted on the clock line of the serial bus. In another example, data throughput may be increased by using double data rate (DDR) encoding whereby a bit of data is transmitted with each transition on the clock signal transmitted on the clock line of the serial bus.

Some devices and protocols may be unable to support higher clock frequencies or DDR encoding. For example, adoption of DDR encoding in RFFE interfaces can be challenging due to tight timing budget, particularly when clock signal frequencies are also increased. Certain aspects disclosed herein provide higher throughput without increasing the base clock frequency. In some examples, data rate of a serial bus can be increased without modifying the encoding/signaling scheme on the data line. In one example, additional data may be encoded on the clock signal used to control timing of data transmission on the serial bus.

Figure 5:
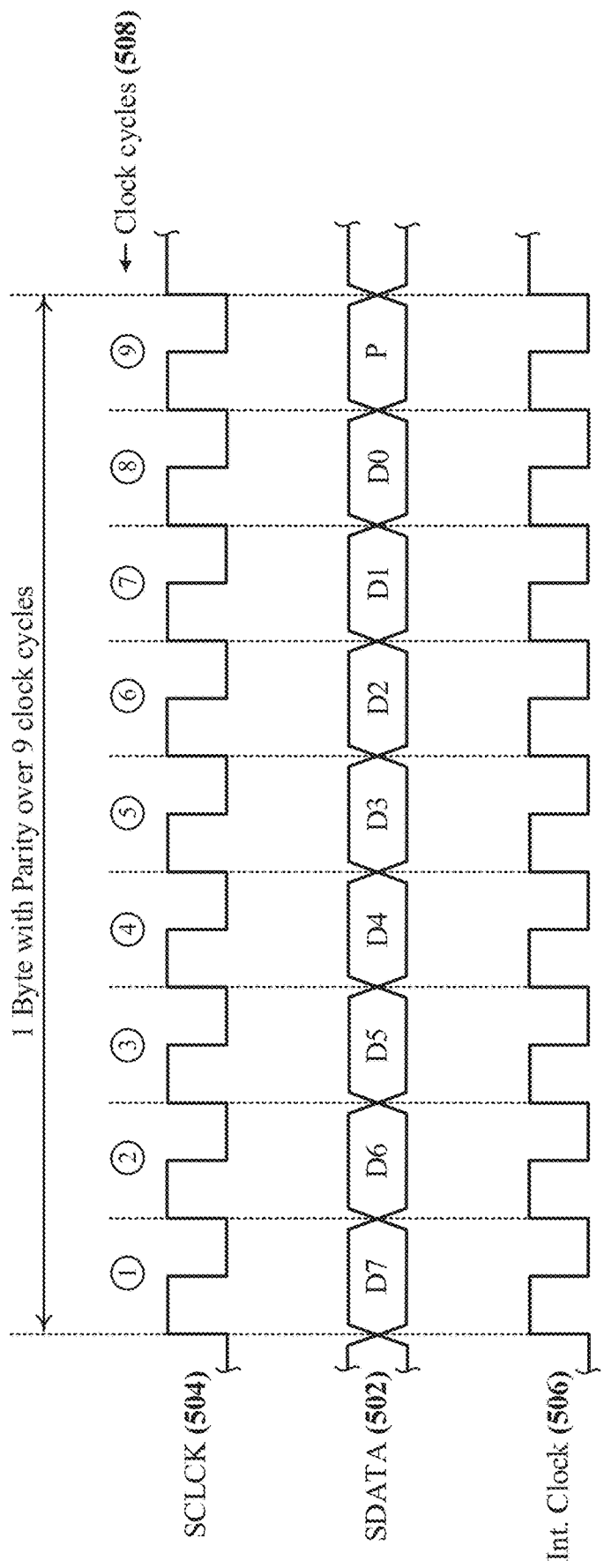
FIG. 5 illustrates certain aspects related to data communication over a serial bus operable in accordance with one or more protocols, including I2C, I3C, RFFE and SPMI protocols.

FIG. 5 is a timing diagram 500 illustrating certain aspects related to data communication over a serial bus operable in accordance with one or more protocols, including I2C, I3C, RFFE, and SPMI protocols. The timing diagram 500 illustrates the relationship between a data signal (SDATA 502) transmitted on a first line of the serial bus in accordance with a clock signal (SCLK 504) transmitted on a second line of the serial bus and an internal clock signal 506 used by a transmitter to generate SCLK 504 or used by a receiver to capture bits from SDATA 502. The internal clock signal 506 may have any phase relationship with SCLK 504. In a nominal example, the internal clock signal 506 may have substantially no phase difference with respect to SCLK 504. In another example, a phase shift may be observable between the internal clock signal 506 and SCLK 504, where phase difference can be attributed to propagation delays over the serial bus and circuit switching times. Circuit switching times may include propagation delays across individual components of a circuit and propagation delays attributable to the operation of stateful circuits, including circuits that include flipflops, counters, latches, and other clocked circuits.

Data may be sampled using rising edges or falling edges of SCLK 504 when single data rate protocols are used to control communication over the serial bus. Data may be sampled using rising edges and falling edges of SCLK 504 when double data rate protocols are used to control communication over the serial bus. In some examples, the internal clock signal 506 may be 90° or 180° out of phase with respect to SCLK 504 to provide a sampling edge at a point in each clock cycle 508 where SDATA 502 is stable. The example illustrated in FIG. 5 corresponds to an SPMI bus implementation that uses SDR encoding of data, or one bit per clock cycle 508 sampled on the falling edges of SCLK 504.

Figure 6:
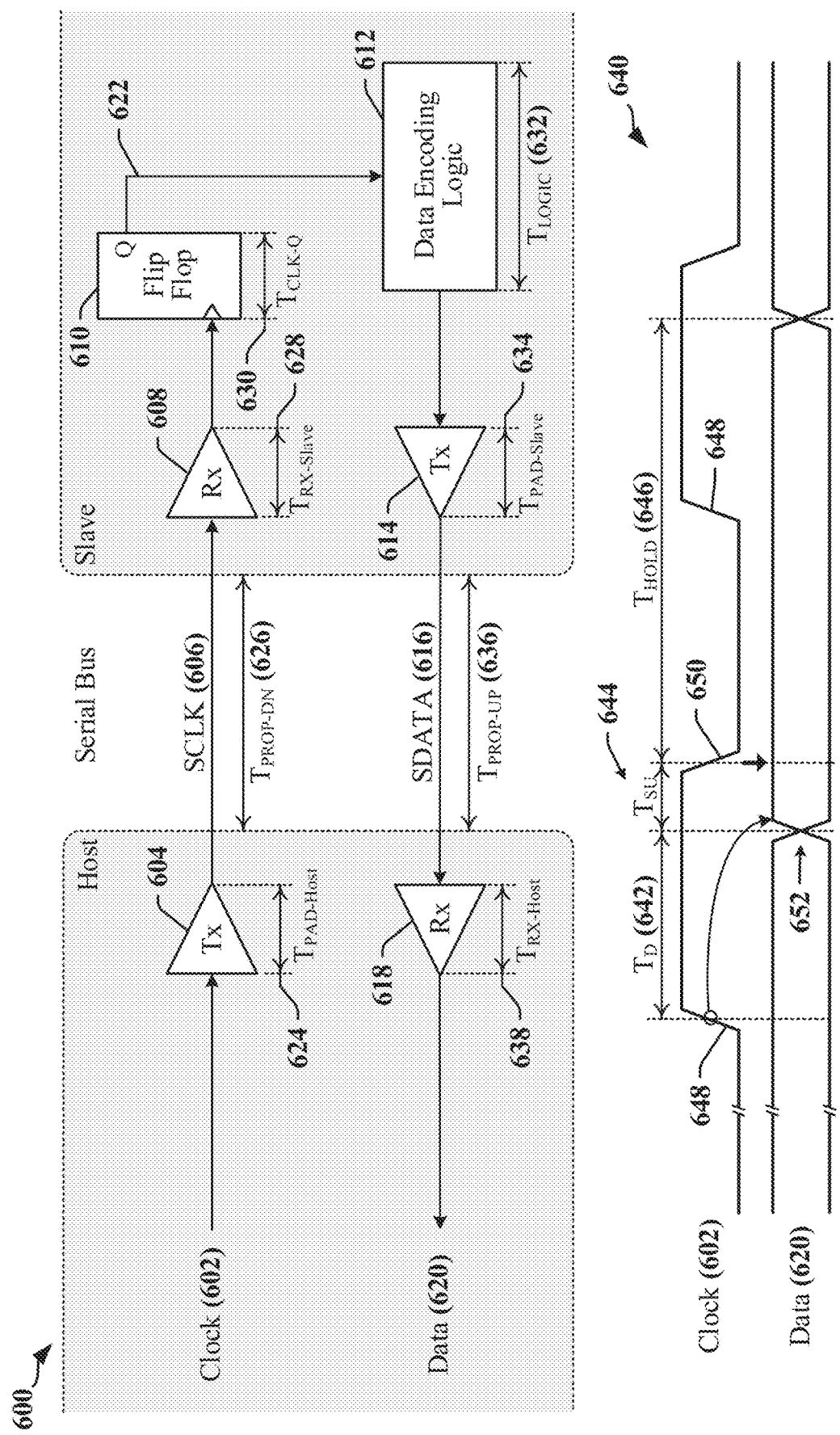
FIG. 6 illustrates a bus interface and associated timing in an apparatus that may be adapted according to certain aspects disclosed herein.

Timing issues may arise when the serial bus is operated at higher data rates. Higher data rates may be accomplished by increasing the frequency of the clock signal transmitted on SCLK 504 and/or by transmitting data in accordance with a DDR protocol. Increased data rates can reduce the setup and hold times that govern operation of data capture circuits. FIG. 6 illustrates a bus interface 600 and associated timing 640 in one example related to a multi-drop serial bus. The multi-drop serial bus may be operated in accordance with an RFFE, SPMI, I3C protocol or the like in which a clock signal 602 that controls transmissions in each direction is supplied by a host device provides the clock signal 602 for read and write operations. In one example, one or more data lines, including SDATA 616, are driven by the transmitting device on the rising edge of the clock signal 602 and data is latched by the receiving device on the falling edge of the clock signal 602. In another example, one or more data lines, including SDATA 616, are driven by the transmitting device on the falling edge of the clock signal 602 and data is latched by the receiving device on the rising edge of the clock signal 602. In another example, one or more data lines, including SDATA 616, are driven by the transmitting device on both the falling and rising edges of the clock signal 602 and data is latched by the receiving device on following edges of the clock signal 602.

In certain implementations, the clock signal 602 may be provided to a line driver of the host pad 604 that provides a bus clock signal over a clock line (SCLK 606). A slave device may include a receiver circuit 608 coupled to SCLK 606, where the receiver provides a signal representative of the clock signal 602 to clock a flipflop 610 that provides an internal clock signal 622 used to capture data from SDATA 616 during write operations, and/or to control encoding and transmission of encoded data signals during read operations. The flipflop 610 may be configured to provide a delay between a first edge used to transmit data, and a second edge used to receive the data. The flipflop 610 may be configured to implement a transmission and receiving scheme where data is transmitted and captured on opposite positive-going and negative going transitions.

The example illustrated in FIG. 6 corresponds to an example of a multi-drop bus operated in accordance with SPMI protocols. Data is transferred using SDR encoding such that data is transmitted on rising edges 648 and sampled by a receiver on falling edges 650 of SCLK 606. In many implementations, bus throughput can be limited when substantial differences in timing between read and write operations result from the different delays that can affect data transmission during read and write operations. A host device implementing SPMI protocols provides the clock signal 602 for read and write operations such that data and a slave device participating in a write transaction uses the falling edges 650 of the clock signal 602 to capture data launched on SDATA 616 by the host device at the rising edges 648 of the clock signal 602. During read transactions, the participating slave device launches data on SDATA 616 after detecting rising edges 648 SCLK 606. The host device produces a data signal 620 representative of the signal transmitted by the slave device over SDATA 616 during read operations. The data signal 620 may be skewed with respect to the clock signal 602 provided for internal use of the host device by delays on both the clock transmission path and the data reception path. In some examples, the data signal 620 received at the slave device during write operations is subjected to delays that closely correspond in size to the delays experienced on the clock transmission path.

For the purposes of this description, it may be assumed that pad and/or transmission path delays associated with SDATA 616 closely match corresponding delays associated with SCLK 606 during write operation, where data is transmitted from the host device to the slave device. The term pad may be used herein to refer to the circuits, drivers and connectors provided within a bus interface that couples a first device to the wires and connectors of the serial bus (SCLK 606 and SDATA 616). Slave devices launch data using a clock signal 622 that is delayed with respect to the internal clock signal 602 of the host device, and the data signal 620 generated in the host device is further delayed during transmission from the slave device to the host device.

Data bits encoded in a data signal transmitted on SDATA 616 may be heavily skewed with respect to the internal clock signal 602 of the host device for higher data rates. A total delay ($T_D$ 642) between a rising edge 648 of the clock signal 602 and a corresponding transition 652 in the data signal 620 may be calculated as the sum of the delay 624 ($T_{PAD\text{-}Host}$) through the host pad 604, the propagation delay 626 over SCLK 606, the delay 628 ($T_{RX\text{-}slave}$) through the slave receiver circuit 608, the delay 630 ($T_{CLK\text{-}Q}$) introduced by the flipflop 610, the delay 632 ($T_{LOGIC}$) associated with data encoding logic 612, the delay 634 ($T_{PAD\text{-}Slave}$) through the slave pad 614, the propagation delay 636 over SDATA 616 and the delay 638 ($T_{RX\text{-}Host}$) through the host receive circuit 618.

A large $T_D$ 642 relative to the period of the clock signal 602 can impact the setup time ($T_{SU}$ 644) available to the slave device for providing a stable signaling state on SDATA 616 before the falling edge 650 in the clock signal 602 that indicates the beginning of the hold period ($T_{Hold}$ 646) during which data may be captured by the host device. The duration of $T_D$ 642 can limit the frequency of the clock signal 602 and the data rate that can be attained and/or sustained over the serial bus.

In some implementations, a synchronous-read technique may be employed where receiver circuits are adapted to use a rising edge 648 of the clock signal 602 to capture data from SDATA 616. In other implementations, a half-speed read may be implemented, which reduces the effective bit rate for the serial bus and may be of practical use in certain applications.

Certain aspects disclosed herein address the described timing closure issue while preserving the timing structures defined by standards-defined protocols. In some implementations, the host device is adapted to use edges in a delayed version of the clock signal 602 to sample, latch or otherwise capture data encoded in a signal transmitted on SDATA 616.

Figure 7:
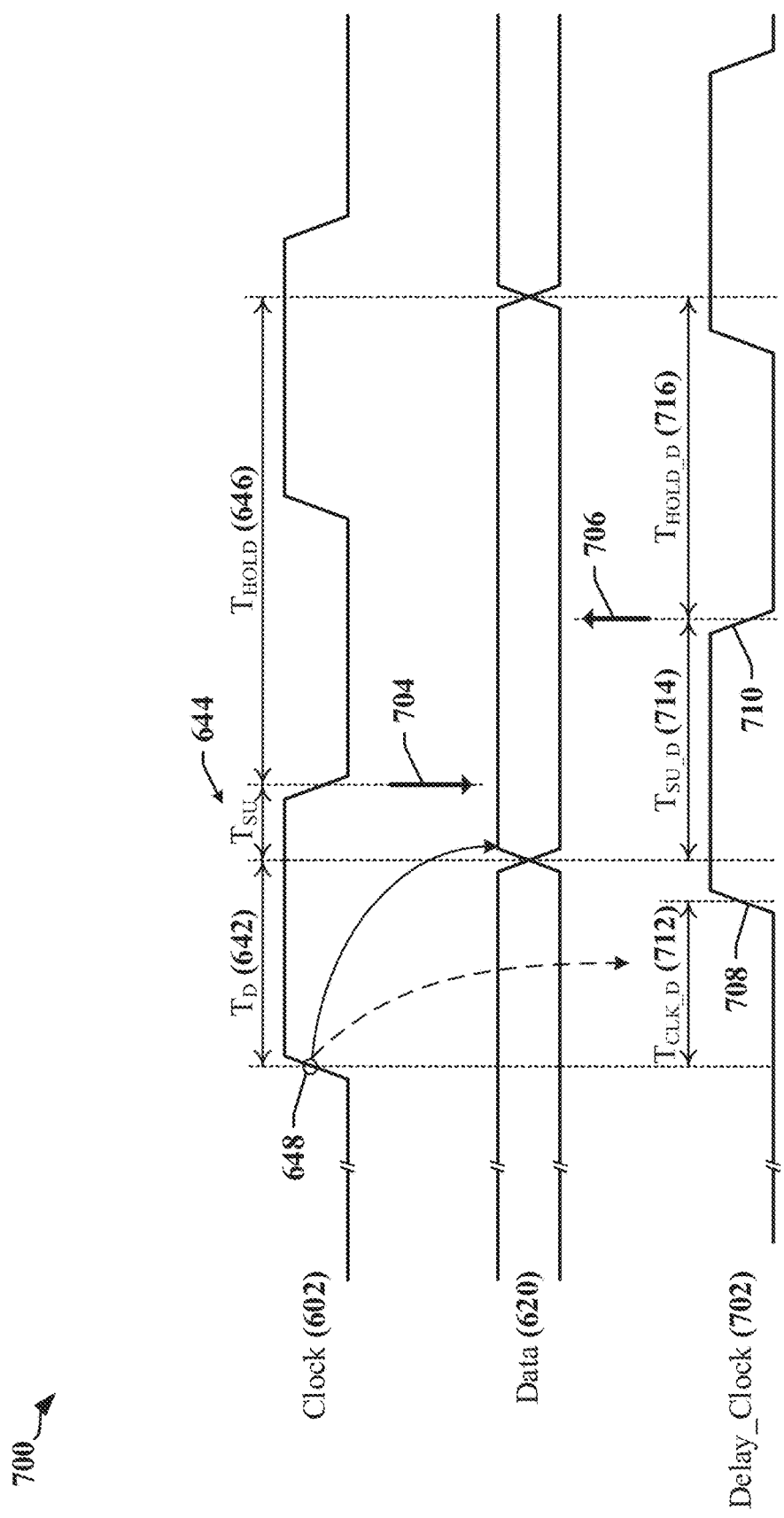
FIG. 7 is a timing diagram illustrating the operation of a serial bus adapted in accordance with certain aspects disclosed herein.

FIG. 7 is a timing diagram 700 illustrating the operation of a serial bus adapted in accordance with certain aspects disclosed herein. In the illustrated example, a host device can derive a delayed clock signal 702 from the clock signal 602 transmitted on SCLK 606. Falling edges 710 in the delayed clock signal 702 may be used to capture data from SDATA 616 at a sample point 706 that is later than the sample point 704 indicated by the base clock signal 602 during read operations. The host device may use a programmable delay path that enables the host device to dynamically change a delay ($T_{CLK\_D}$ 712) applied to the base clock signal 602 in order to obtain the delayed clock signal 702, as illustrated with respect to the example of the rising edges 648, 708 in the clock signals 602, 702 respectively. The programmable delay path may be configured to approximate or match $T_D$ 642 in a slave device that is to be read and to reduce the impact of $T_D$ 642 on the setup time ($T_{SU}$ 714) and the hold period ($T_{HOLD}$ 716). In one example, $T_{CLK\_D}$ 712 may be selected for a particular set of process, voltage and/or temperature (PVT) operating conditions. In another example, different $T_{CLK\_D}$ 712 values may be used for communicating with different slave devices.

The delayed clock signal 702 may be used in other circumstances where a timing skew exists between clock and/or data lanes. In some instances, the host device may bypass the programmable delay path. For example, a multidrop serial bus may be operable at multiple clock frequencies, where delayed clocking is used in one or more higher-frequency modes of operation and the programmable delay path is bypassed in other, lower-frequency modes of operation.

Figure 8:
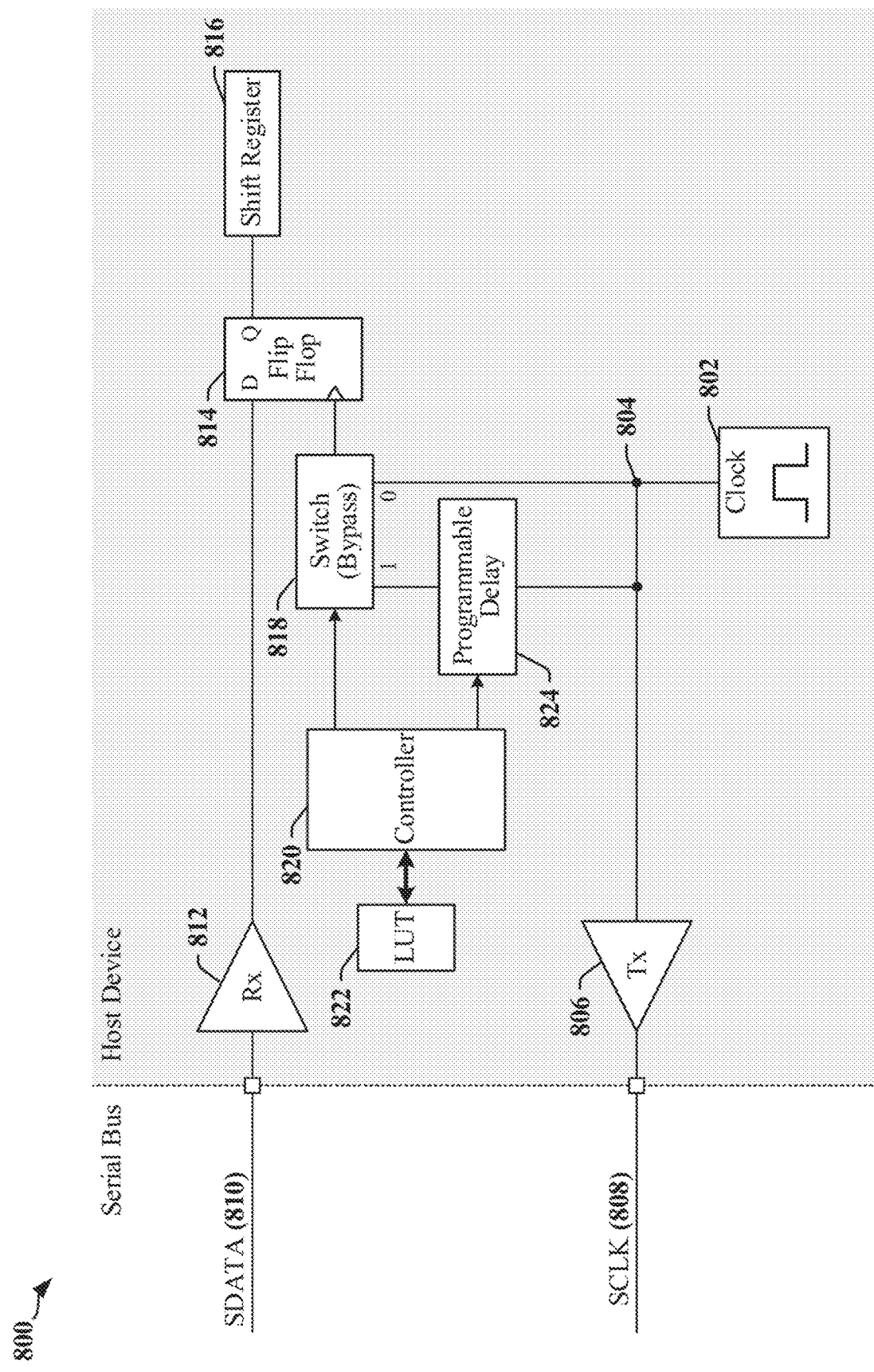
FIG. 8 illustrates an example of a bus interface in a host device adapted in accordance with certain aspects disclosed herein.

FIG. 8 illustrates a first example of a bus interface 800 in a host device adapted according to certain aspects disclosed herein. The bus interface 800 may couple the host device to a multi-drop serial bus. In the illustrated example, the serial bus includes a clock line (SCLK 808) and a data line (SDATA 810). In some instances, the serial bus includes multiple data lanes.

The host device includes a clock source 802, which may be implemented using a clock generator, frequency divide or multiply circuits and/or other logic. The clock source 802 provides a clock signal 804 that is transmitted by a line driver 806 on SCLK 808 and that may be used to control the timing of data transmissions over the serial bus. The clock signal 804 may be provided to a programmable delay circuit 824 that can be configured to select from multiple versions of the clock signal 804, each version having a different delay with respect to the clock signal 804 and with respect to each of the other versions of the clock signal 804. The programmable delay circuit 824 enables the host to implement a branched-clock approach that includes the use of delayed and non-delayed clock branches. The non-delayed clock branch (the clock signal 804) can be transmitted over SCLK 808 to external slave devices and the host device may select a suitable clock branch to match $T_D$ 642 associated with a slave device that is to be read.

The host device may include a controller 820 that configures and/or operates the programmable delay circuit 824. The controller 820 may be implemented using a microprocessor, microcontroller and/or finite state machine. The controller 820 may maintain or have access to a look-up table (LUT 822) that defines the delay value to be applied to obtain a delayed version of the clock signal 804 for capturing data from SDATA 810. In one example, a line receiver 812 coupled to SDATA 810 provides a data signal to a flipflop 814 that is clocked by a version of the clock signal 804. The version of the clock signal 804 may be provided by the programmable delay circuit 824 or by the clock source 802. The controller 820 may control a switch 818 that selects between the output of the programmable delay circuit 824 and the clock source 802 to provide a signal that clocks the flipflop 814. The flipflop 814 provides a stream of data bits that may be captured in a shift register 816.

The LUT 822 may be configured with one or more delay values for each slave device known to the host device. The delay values may be used by the controller 820 to configure the switch 818 and the programmable delay circuit 824 for each transaction and/or to provide automatic delay adjustment. The LUT 822 may be configured during manufacture, system integration and/or initialization. The delay values may be obtained from characterization of the host and slave devices and/or the serial bus. In some instances, the LUT 822 may be configured or reconfigured in a calibration procedure. In certain implementations, delay values may be selected based on current PVT conditions.

Figure 9:
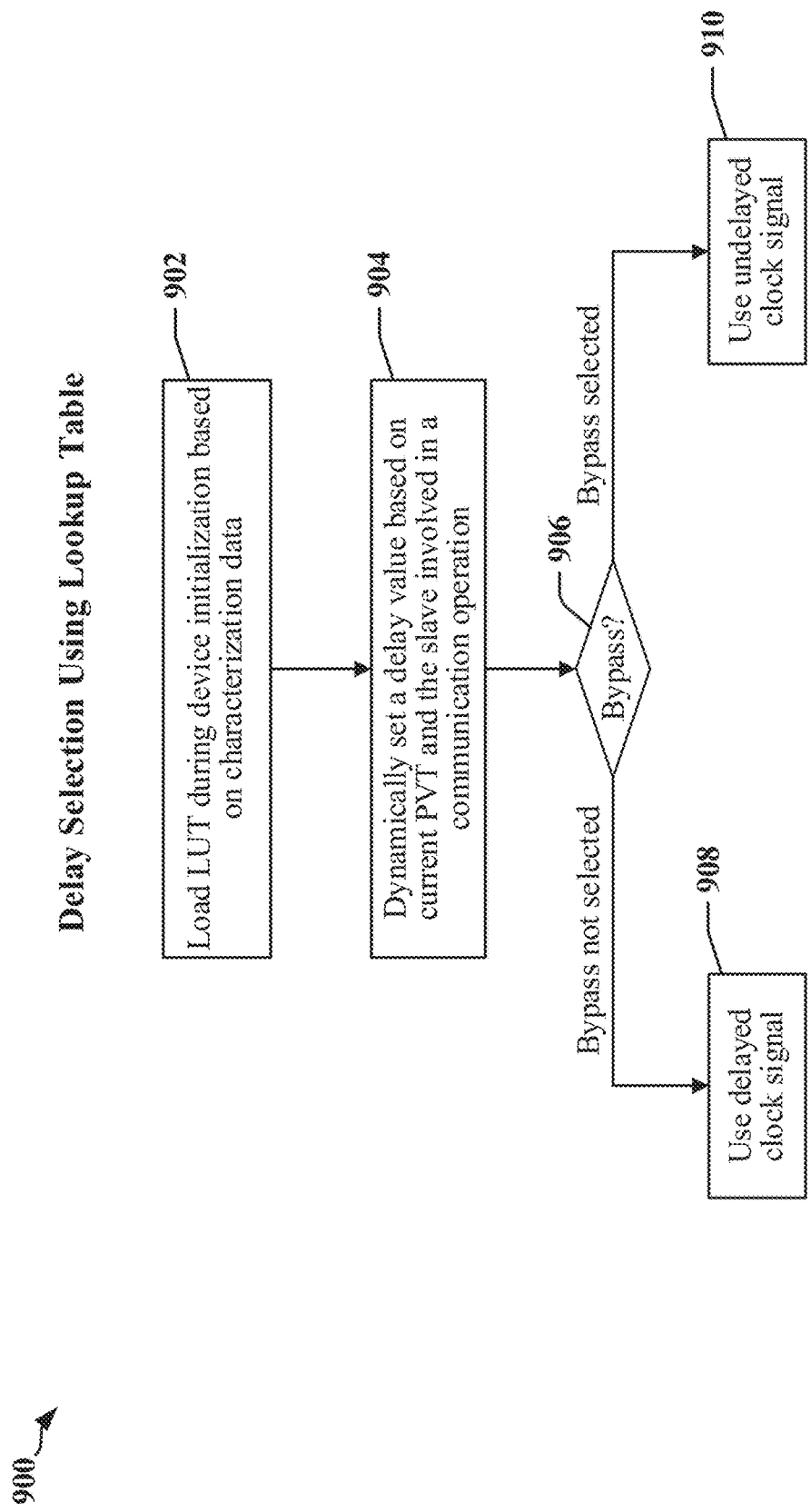
FIG. 9 is a flowchart illustrating certain aspects of a system that employs a lookup table to dynamically select or adjust a delay used for receiving data during a read operation.

FIG. 9 is a flowchart 900 illustrating certain aspects of a system that employs the LUT 822 to dynamically select or adjust a delay used for receiving data during a read operation. At block 902, the LUT 822 may be loaded during system or device initialization. The LUT 822 may be populated using values calculated or determined from characterization, simulation and/or empirical testing. At block 904, the controller 820 may configure the programmable delay circuit 824 to be used in a transaction with a slave device. The controller 820 may set a delay value for the slave based on current PVT conditions. At block 906, the controller 820 may determine whether a bypass is to be selected. A bypass is selected when the clock signal is to be used without a delay at block 910. A bypass is not selected when the clock signal is to be used with a delay at block 908.

Components of Delays Applied to Data Sampling Timing

Timing differences between clock and data lanes during slave read transactions may exhibit substantial variability between different systems and within systems in which slaves coupled to a multidrop serial bus are associated with different propagation delays or capacitive loading, for example. Certain aspects disclosed herein apply a delay to data sampling timing that includes coarse and fine components. In one example, a sampling timing delay includes a coarse component having an integer number of clock cycles or clock half-cycles. In another example, a sampling timing delay includes a fractional number of clock cycles or clock half-cycles to obtain a fine component. In this description, the coarse component may be referred to as a coarse delay and the fine component may be referred to as a fractional delay.

The fractional delay may be implemented using a programmable delay circuit 824 (see FIG. 8). In certain implementations, the programmable delay circuit 824 may be implemented as a delay-locked loop (DLL) that is configured and/or controlled to change the phase of the clock signal 804 to derive the sampling clock signal. A DLL typically includes series of delay elements that provides a phase shifted version of the input signal. During set up or frequency acquisition, a DLL may compare the phase of its last output with a reference input signal to generate an error signal which is then integrated and provided as a control feedback signal to configure the DLL and/or the delay elements in the DLL.

In some implementations, the coarse delay obtained by delaying the clock signal 804 by a number of clock cycles or clock half-cycles may be applied before a baseline DL-based fractional delay is applied to obtain synchronization and/or optimal sampling edges. In some implementations, the coarse delay is obtained by delaying a phase-shifted clock signal provided by the programmable delay circuit 824 by a number of clock cycles or clock half-cycles to obtain synchronization and/or optimal sampling edges.

In certain implementations, a host device has a priori knowledge of the overall response delay associated with reads from a slave. The a priori knowledge of the overall response delay may be expressed as an integer number of clock cycles or clock half-cycles that may be used to generate the coarse delay, and may include information used to configure the fractional delay for optimal sampling point adjustment.

In some instances, a priori knowledge of the coarse delay may be unavailable or in need of calibration, and the host device may determine delay values through a calibration procedure. In one example, the host device may attempt to read a known register location with known content with initial coarse delay value, which may be a minimal or no delay. In one example of calibration, a minimal delay may be one clock cycle or one clock half-cycle. The coarse-delay may be incremented by one clock cycle or one clock half-cycle, as appropriate, after each failure to read the true value of the known register until a successful read is accomplished, or until a maximum delay has been reached. In another example of calibration, the master device may write a test value at a predetermined register location and then attempt to read it back using different coarse delay values until the test value is correctly read from the predetermined register location.

The fractional delay may be calibrated in a similar manner after the coarse delay value has been determined. In one example, the host device may use a coarse delay value decremented by one clock cycle or one clock half-cycle, as appropriate, to find a combination of coarse delay value and fractional delay value that can provide an optimized sampling edge. In another example, the fractional delay may be configured to synchronize sampling edges with respect to transitions in the data signal.

In some implementations, an automated coarse delay adjustment may be obtained for each transaction, after a change in operating conditions and/or during system initialization. The automated coarse delay adjustment may be based on clock cycles or clock half-cycles elapsed between an intended launch edge in the clock signal 804 at the master device, and the edge corresponding to the launch of data by the slave device.

In some devices, timing closure issues arising in slave read operations cannot be resolved without using a coarse delay. Omitting a coarse delay, which may be stated as a delay of zero clock cycles or half-cycles, requires that each data launch during data fetch is performed by the slave within a single cycle in SDR mode and within each half-cycle during certain DDR implementations.

In some implementations, a slave device may require additional clock cycles for fetching data during reads from one or more registers. Additional cycle requirements may be based on the register and/or memory implementation architecture in the slave device. The host device may configure or be configured with multiple delay values for each slave device. In one example, a base delay value may be configured for a slave device and delay values may be maintained for register addresses within the slave device for which the slave device requires additional clock cycles to respond to a read command. In another example, a base delay value may be configured for a slave device and delay values may be maintained for address regions within the slave device for which the slave device requires additional clock cycles to respond to a read command. The host device may be configured to use different delay values for different slave devices. In FIG. 2, for example, the master device 202 may be operating as a host device and may use different delay values when reading from the slave devices $222_0$-$222_N$. In one example, the master device 202 may use a 1-cycle delay value when reading from one slave device $222_0$, a 2-cycle delay value when reading from another slave device $222_1$, and no coarse delay when reading from another slave device $222_2$.

Coarse delay circuits may be configured such that a slave device launches data on a type of edge prescribed by protocols, delayed by an integer number of clock-cycles. Some protocols specify that data is launched on positive-going edges and other protocols specify that data is launched on negative-going edges. In some implementations, bus interfaces may be adapted to support change in edge type for launching data. In one example, DDR protocols typically specify that data is launched and sampled on both positive-going edges and negative-going edges. In the latter example, half-cycle delays may be introduced that cause data bits that were expected to be sampled on a positive-going edge is captured on a negative-going edge, and vice versa. It is contemplated that a coarse delay circuit can be configured for reading and writing with the same edge type, for reading and writing with on different edge types, and adaptability such that the edge type used for read and/or write may vary with the size for the coarse delay.

The addition of a non-zero coarse delay read cycle can provide a pipelining capability in a slave device. Pipelining can provide relaxed timing closure for the slave device, including when certain registers or memory requires additional clock cycles for responding to read commands.

Figure 10:
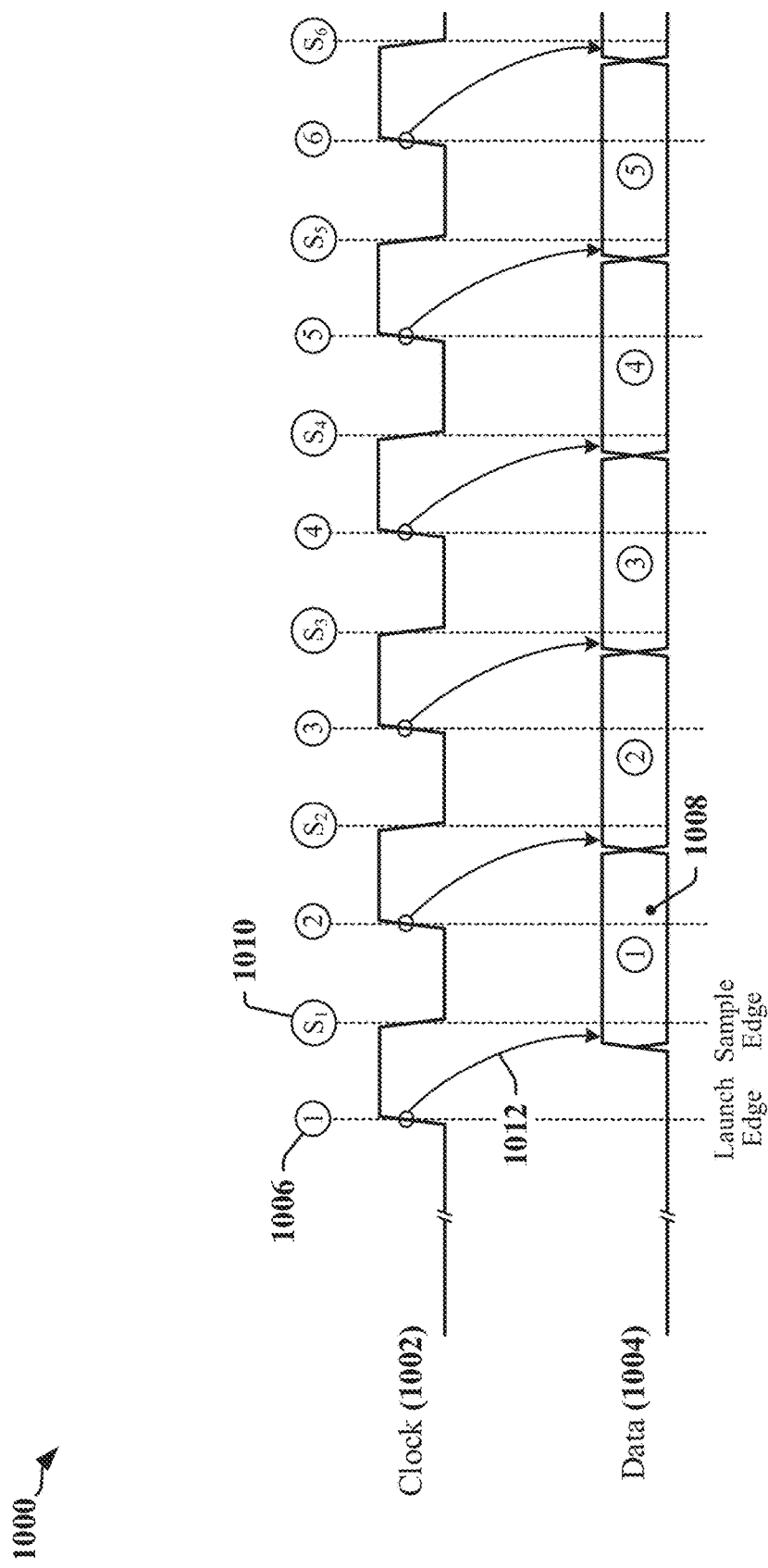
FIG. 10 illustrates a first example of timing in which a coarse delay is not used for receiving data during a read operation in accordance with certain aspects disclosed herein.

FIG. 10 illustrates a first example of timing 1000 in which a coarse delay is not used for receiving data from a slave device during a read operation in accordance with certain aspects disclosed herein. The timing 1000 may be applicable to some implementations in which a zero-valued coarse delay can be configured. In this example, a data bit is launched in a data signal 1004 in response to a rising edge in the clock signal 1002 provided by the host device. The illustrated example relates to a read operation where a slave device launches data in the data signal 1004. In the illustrated example, a first rising edge 1006 provided after a valid read command causes the slave device to launch a first data bit 1008 in the data signal 1004, which is detected by the host device after a delay 1012 that includes an accumulation of propagation delays including circuit switching times and transmission path propagation delays. The host device may sample the data signal 1004 at the next falling edge 1010 in the clock signal 1002 or using a fractionally-delayed edge derived from the falling edge 1010. In some instances, multiple data signals in a multilane serial bus may be sampled without a coarse delay in accordance with the timing 1000 illustrated in FIG. 10.

Figure 11:
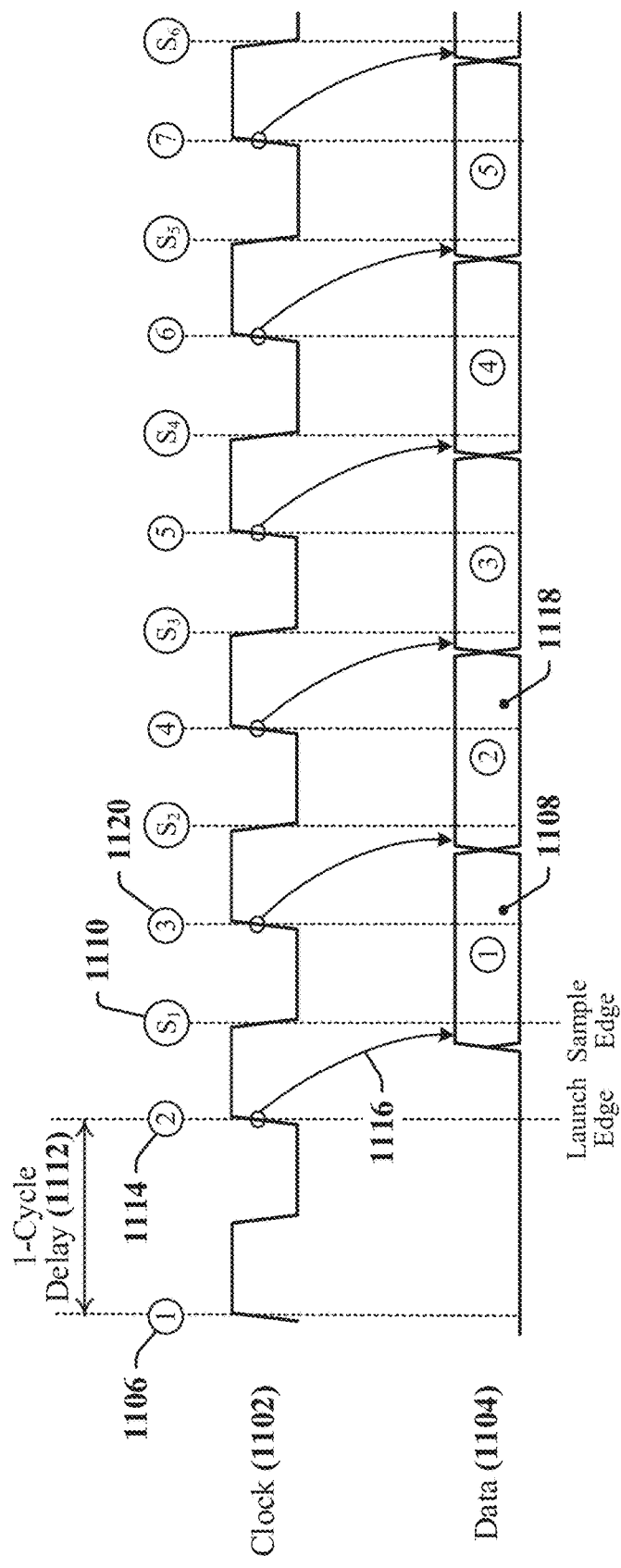
FIG. 11 illustrates a second example of timing in which a coarse delay of one clock cycle is configured or enabled for receiving data during a read operation in accordance with certain aspects disclosed herein.

FIG. 11 illustrates a second example of timing 1100 in which a coarse delay of one clock cycle is configured or enabled for receiving data from a slave device during a read operation in accordance with certain aspects disclosed herein. In this example, a data bit is launched in a data signal 1104 in response to a rising edge in the clock signal 1102 provided by the host device and sampled responsive to a subsequent falling edge in the clock signal 1102. The example illustrated in FIG. 11 relates to a read operation where a slave device delays launch of data bits in the data signal by one cycle of the clock signal 1102. A first rising edge 1106 provided after a valid read command causes the slave device to launch a first data bit 1108 in the data signal 1104 at a second rising edge 1114 of the clock signal. The second rising edge 1114 is provided in the next clock cycle of the clock signal 1102 and a one-cycle coarse delay 1112 is observed between the first rising edge 1106 and launch of the first data bit 1108. A transition in the data signal 1104 corresponding to the first data bit 1108 may be detected by the host device after a delay 1116 that includes an accumulation of propagation delays including circuit switching times and transmission path propagation delays. The host device may sample the data signal 1104 at the next falling edge 1110 in the clock signal 1102 or using a fractionally-delayed edge derived from the falling edge 1110. In some instances, multiple data signals in a multilane serial bus may be sampled in accordance with the timing 1100 illustrated in FIG. 11.

The one-cycle coarse delay 1112 enables pipelining at the slave device. The slave device begins loading the pipeline in response to the first rising edge 1106 and launches bits from the pipeline after the second rising edge 1114. A second data bit 1118 may be loaded into the pipeline in response to the second rising edge 1114 and launched by the slave after a third rising edge 1120.

Figure 12:
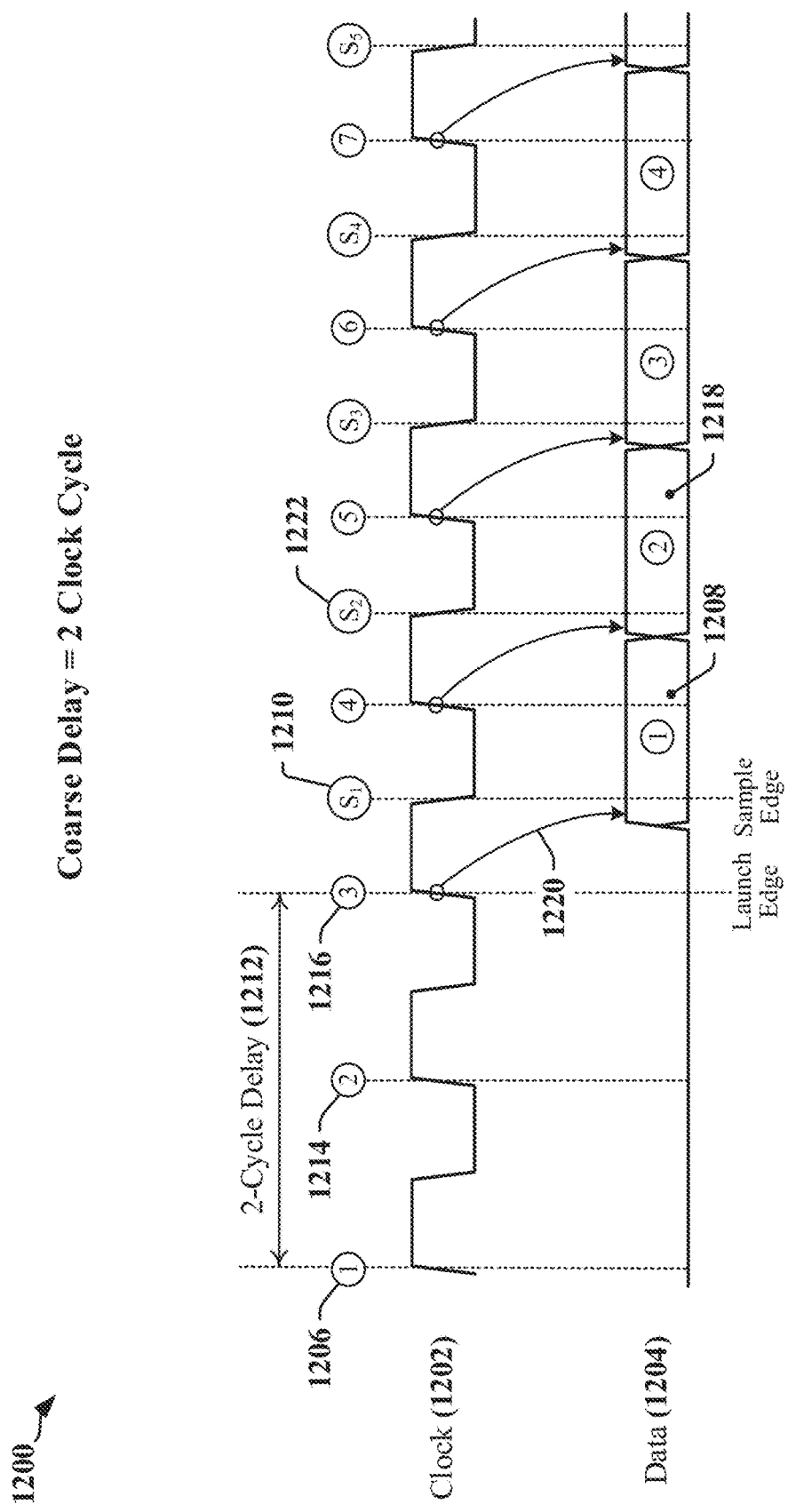
FIG. 12 illustrates a third example of timing in which a coarse delay of two clock cycles is configured or enabled for receiving data during a read operation in accordance with certain aspects disclosed herein.

FIG. 12 illustrates a third example of timing 1200 in which a coarse delay of two clock cycles is configured or enabled for receiving data from a slave device during a read operation in accordance with certain aspects disclosed herein. In this example, a data bit is launched in a data signal 1204 in response to a rising edge in the clock signal 1202 provided by the host device and sampled responsive to a subsequent falling edge in the clock signal 1202. The example illustrated in FIG. 12 relates to a read operation where a slave device delays launch of data bits in the data signal by two cycles of the clock signal 1202. A first rising edge 1206 provided after a valid read command provides timing related to the launch of a first data bit 1208 in the data signal 1204. A second rising edge 1214 provided after the read command provides timing related to the launch of a second data bit 1218 in the data signal 1204. The slave device launches the first data bit 1208 at a third rising edge

1216 of the clock signal. The use of the third rising edge 1216 to launch the first data bit 1208 results in a two-cycle coarse delay 1212 between the first rising edge 1206 and launch of the first data bit 1208. A transition in the data signal 1204 corresponding to the first data bit 1208 may be detected by the host device after a delay 1220 that includes an accumulation of propagation delays including circuit switching times and transmission path propagation delays. The host device may sample the data signal 1204 at the next falling edge 1210 in the clock signal 1202 or using a fractionally-delayed edge derived from the falling edge 1210. In some instances, multiple data signals in a multilane serial bus may be sampled in accordance with the timing 1200 illustrated in FIG. 12.

The two-cycle coarse delay 1212 enables pipelining at the slave device. The slave device begins loading the pipeline in response to the first rising edge 1206 and launches bits from the pipeline after the third rising edge 1216. A second data bit 1218 may be loaded into the pipeline in response to the second rising edge 1214 and launched by the slave device after a fourth rising edge 1222.

Figure 13:
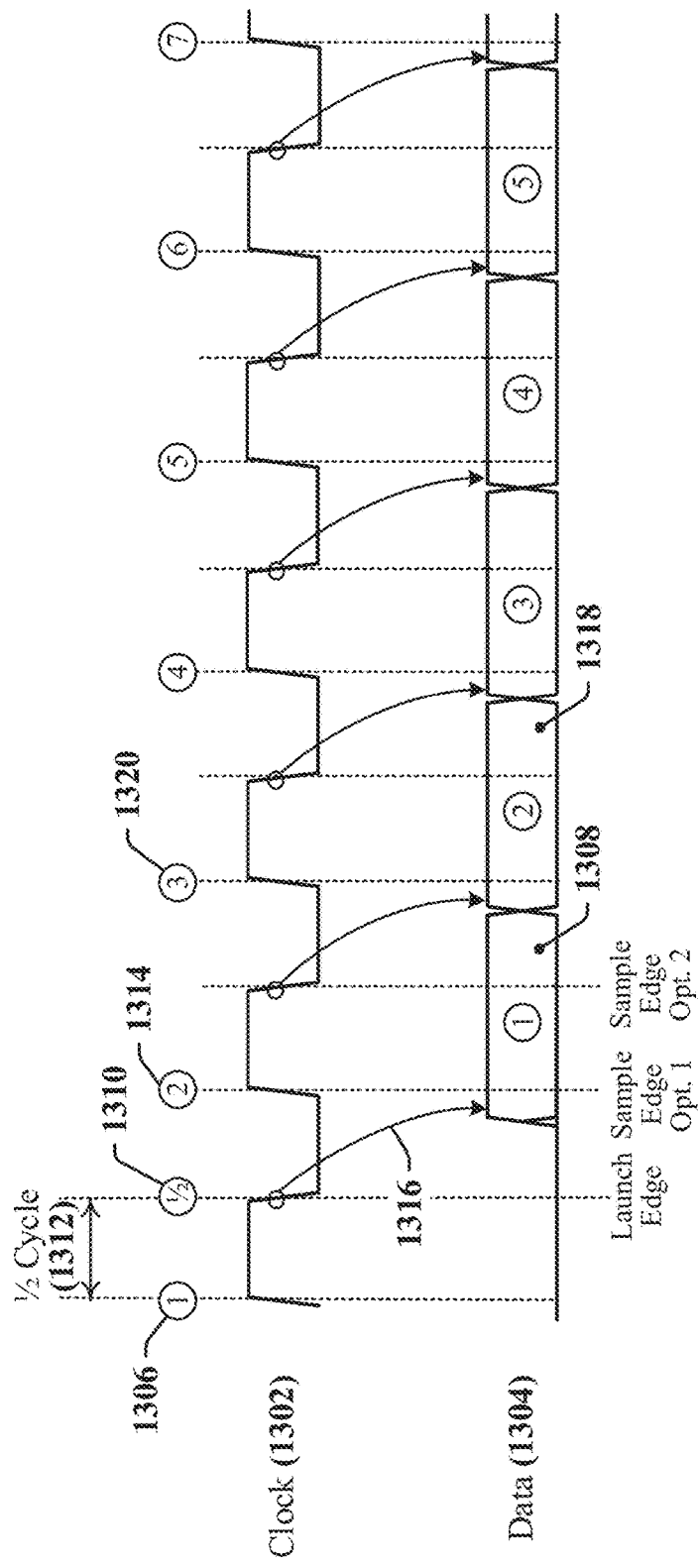
FIG. 13 illustrates a fourth example of timing in which a slave device is configured with a coarse delay measured in half-clock cycles for receiving data during a read operation in accordance with certain aspects disclosed herein.

In some implementations, coarse delays may be configured as a number of half cycles. FIG. 13 illustrates a fourth example of timing 1300 in which a slave device is configured with a coarse delay measured in half-clock cycles for receiving data from a slave device during a read operation in accordance with certain aspects disclosed herein. In this example, a data bit is launched in a data signal 1304 in response to an edge in the clock signal 1302 provided by the host device and sampled responsive to a subsequent edge in the clock signal 1302. The example illustrated in FIG. 13 relates to a read operation where a slave device delays launch of data bits in the data signal by a half-cycle of the clock signal 1302. A first rising edge 1306 provided after a valid read command causes the slave device to launch a first data bit 1308 in the data signal 1304 at the subsequent falling edge 1310 of the clock signal. A half-clock cycle coarse delay 1312 is observed between the first rising edge 1306 and launch of the first data bit 1308. A transition in the data signal 1304 corresponding to the first data bit 1308 may be detected by the host device after a delay 1316 that includes an accumulation of propagation delays including circuit switching times and transmission path propagation delays. The host device may sample the data signal 1304 at the next rising edge 1314 or the next falling edge 1310 in the clock signal 1302 or using a fractionally-delayed edge derived from the next rising edge 1314 or the next falling edge 1310 in the clock signal 1302. Coarse delays may be defined as multiples of half-cycles when the serial bus is operated in accordance with a DDR protocol, to optimize timing and/or circuit design, or for other reasons.

In some instances, multiple data signals in a multilane serial bus may be sampled in accordance with the timing 1300 illustrated in FIG. 13. The half-cycle coarse delay 1312 enables pipelining at the slave device, including pipelining in DDR applications. In an SDR application, the slave device loads data into the pipeline in response to each rising edge 1306, 1314, 1320. In a DDR application, the slave device loads data into the pipeline in response to each rising edge 1306, 1314, 1320 and falling edge 1310.

In-Circuit Latency Estimation

In some implementations, a host device may measure or estimate bus latency with respect to one or more slave devices coupled to the serial bus. Bus latency may be representative of the delay 1012 (see FIG. 10) between a first edge in the clock signal and the presence of stable data in the data signal 1004. Bus latency may be determined using known or expected signaling characteristics associated with a protocol and/or by a measurement procedure disclosed herein.

Figure 14:
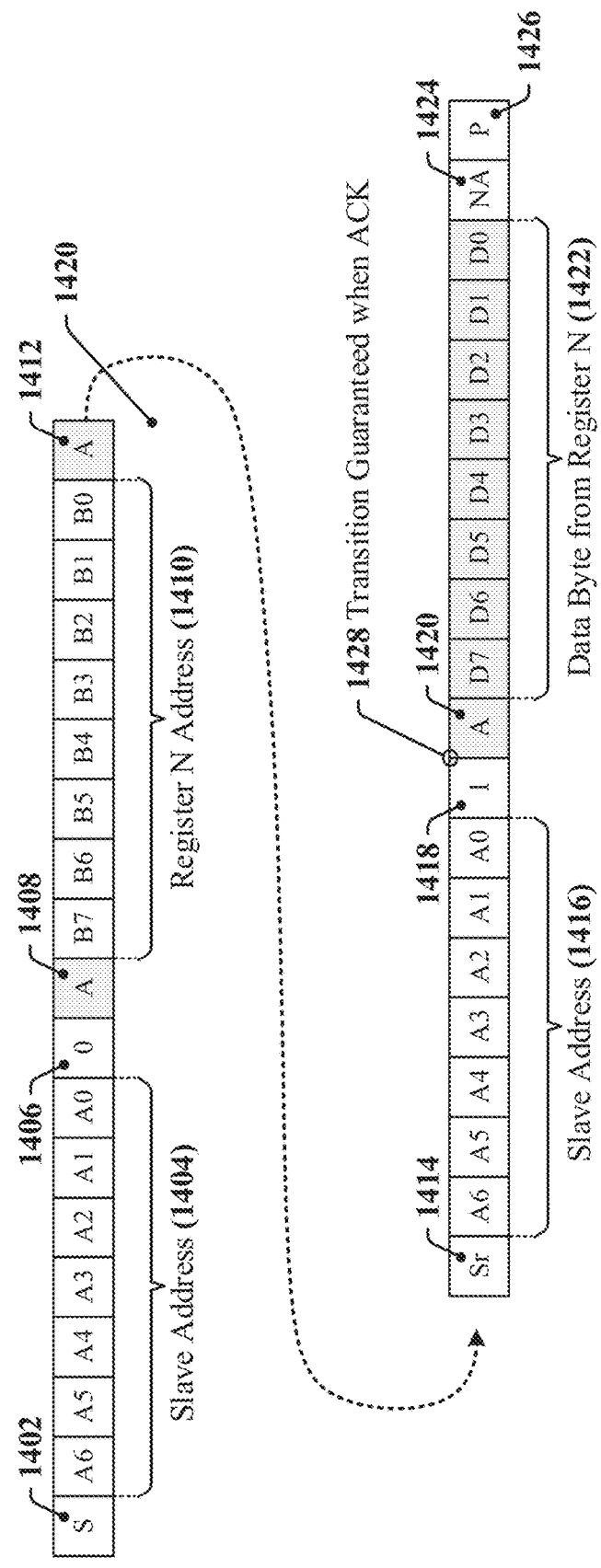
FIG. 14 illustrates a slave read transaction in accordance with an I2C and/or I3C protocol.

In one example of latency estimation, automatic delay adjustment may be performed by a bus master during normal or ordinary transactions with slave devices. A bus master operating in accordance with an I2C or I3C protocol may measure the response time of a slave device through an ACK/NACK transmission. FIG. 14 illustrates a slave read transaction 1400 in accordance with an I2C and/or I3C protocol. The bus master device provides a START condition 1402 followed by the slave address 1404 of the slave to be read. The 7-bit slave address 1404 is followed by a low read/write bit 1406, indicating a write is to follow. The slave device acknowledges the slave address 1404 by driving the data line low during a first ACK/NACK slot 1408. The bus master device may then transmit an 8-bit register address 1410, which is followed by a second ACK/NACK slot 1412. Upon detecting an acknowledgement (data line low), the bus master device may transmit a Repeated Start 1414 followed by the 7-bit slave address 1416 of the slave to be read, followed by a high read/write bit 1418 indicating a read command. An acknowledgement signaled by the slave device in a third ACK/NACK slot 1420 causes a guaranteed transition 1428 on the data line, which is driven low by the slave device from the high provided by the bus master device in the read/write bit 1418. The slave device then transmits a data byte 1422 read from the register identified by the 8-bit register address 1410. The bus master device provides an ACK or a NACK in a fourth ACK/NACK slot 1424 and may terminate the transaction with a STOP condition 1426.

Figure 15:
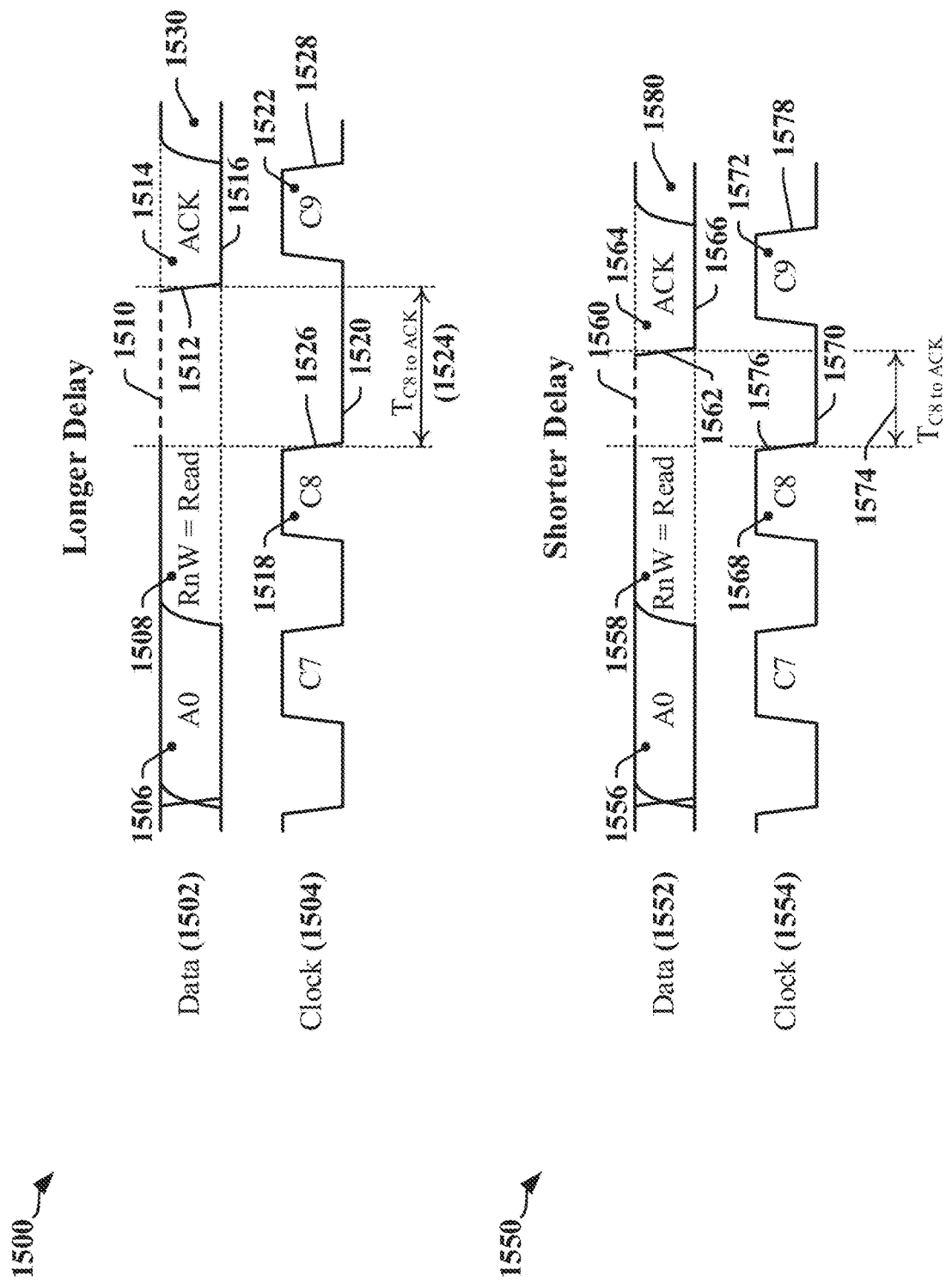
FIG. 15 illustrates timing examples in which bus latencies are measurable using ACK/NACK transmissions defined by certain protocols in accordance with certain aspects disclosed herein.

According to certain aspects disclosed herein, the bus master device may measure the response time of a slave device as the difference in time between the edge marking the termination of the read/write bit 1418 and the ACK transition 1428 detected on the data line. FIG. 15 illustrates two timing examples 1500, 1550 representing bus latencies measurable using ACK/NACK transmissions defined by certain protocols. In the first timing example 1500, a bus master device initiates a read transaction by actively driving the read/write bit 1508 high (signifying device READ) after transmission of the last address bit 1506 in the data line 1502. The read/write bit 1508 is defined based on timing of a clock pulse (C8 1518) transmitted on the clock line 1504. The bus master device terminates active drive at the falling edge 1526 of C8 1518 and enables a weak pullup structure or circuit that holds the data line 1502 in an undriven high state 1510. In one example, the data line 1502 is pulled to the high state 1510 using a pullup resistor. In another example, the data line 1502 is pulled to the high state 1510 using a keeper circuit. The bus master device maintains the clock line 1504 in a low signaling state 1516 to provide the slave device an opportunity to acknowledge the read transaction.

The slave device may provide an acknowledgement by actively driving the data line 1502 to the low signaling state 1516 during the timeslot 1514 allocated for ACK/NACK. Upon detecting the data line 1502 being in a low signaling state, the bus master device may provide a clock pulse (C9 1522) on the clock line 1504 and release the data line 1502 at the falling edge of C9 1522 to enable the slave device to continue the read transaction by transmitting a first bit of data 1528. In certain examples, the bus master device is communicating over the data line 1502 using push-pull drivers according to SPMI or I3C protocols, for example, and releases the data line 1502 at the falling edge of C9 1522 by causing its line driving circuit to enter a high-impedance mode by disabling the weak pullup structure or circuit and maintaining a high-impedance output on its line driver. In other examples, the bus master device is communicating over the data line 1502 using open-drain drivers according to an I2C protocol, for example, and releases the data line 1502 at the falling edge of C9 1522 by refraining from driving the data line 1502 low. In these examples, the weak pullup structure or circuit remains active or connected to provide the high signaling state during slave device transmissions.

The bus master may determine the duration of time 1524 between the falling edge 1526 of C8 1518 and detection of the transition 1512 in the data line 1502 marking the beginning of the acknowledgement. The bus master may calculate a delay value as the difference between the measured duration of time 1524 and a specified or expected duration between falling edge 1526 of C8 1518 and detection of the transition 1512. From this difference, the bus master device may configure a delay parameter used by the bus master device during reads from the measured slave device. In some instances, the bus master device may measure the duration of time 1524 between the falling edge 1526 of C8 1518 and detection of the transition 1512 in the data line 1502 in clock cycles or clock half-cycles in order to configure a coarse delay. In other instances, the bus master device may measure the duration of time 1524 between the falling edge 1526 of C8 1518 and detection of the transition 1512 in the data line 1502 using a higher-frequency clock signal to configure a fractional delay.

The second timing example 1550 represents a latency that is close to nominal conditions. In the second timing example 1550, a bus master device initiates a read transaction by actively driving the read/write bit 1558 high (signifying device READ) after transmission of the last address bit 1556 in the data line 1552. The read/write bit 1558 is defined based on timing of a clock pulse (C8 1568) transmitted on the clock line 1554. The bus master device terminates active drive at the falling edge 1576 of C8 1568 and enables a weak pullup structure or circuit that holds the data line 1552 in an undriven high state 1560. In one example, the data line 1552 is pulled to the high state 1560 using a pullup resistor. In another example, the data line 1552 is pulled to the high state 1560 using a keeper circuit. The bus master device maintains the clock line 1554 in a low signaling state 1566 to provide the slave device an opportunity to acknowledge the read transaction.

The slave device may provide an acknowledgement by actively driving the data line 1552 to a low signaling state 1566 during the timeslot 1564 allocated for ACK/NACK. Upon detecting the data line 1552 being in a low signaling state, the bus master device may provide a clock pulse (C9 1572) on the clock line 1554 and release the data line 1552 at the falling edge of C9 1572 to enable the slave device to continue the read transaction by transmitting a first bit of data 1578. In certain examples, the bus master device is communicating over the data line 1552 using push-pull drivers according to SPMI or I3C protocols, for example, and releases the data line 1552 at the falling edge of C9 1572 by causing its line driving circuit to enter a high-impedance mode by disabling the weak pullup structure or circuit and maintaining a high-impedance output on its line driver. In other examples, the bus master device is communicating over the data line 1552 using open-drain drivers according to an I2C protocol, for example, and releases the data line 1552 at the falling edge of C9 1572 by refraining from driving the data line 1552 low. In these examples, the weak pullup structure or circuit remains active or connected to provide the high signaling state during slave device transmissions.

The bus master may determine the duration of time 1574 between the falling edge 1576 of C8 1568 and detection of the transition 1562 in the data line 1552 marking the beginning of the acknowledgement. In this example, the bus master may determine that the duration of time 1574 is sufficiently close to nominal time that read transactions can be performed with the measured slave device without a coarse delay.

Automatic delay adjustment may be performed for one or more slave devices coupled to the serial bus. Latency may be measured periodically, or for every read command and/or coarse delays may be configured upon detection of a change in latency, a change in PVT conditions, at system startup or by command of control software. In some examples, latency may be measured when one or more slave devices are coupled to the serial bus and become active on the serial bus during a hot-join process.

In another example of latency estimation, a bus master device may initiate one or more transactions to read data from a known register location. The bus master device may configure an initial low-value or zero-value for coarse delay before attempting to read the known register location. The bus master device may repetitively increase the delay value and retry reading the known register location when read commands returns data that does not have the correct value for the known register location. In one example, the bus master device increases the delay value in increments of a single clock cycle. In one example, the bus master device increases the delay value in increments of a half-cycle of the clock signal. In certain implementations, the bus master device may write a known value to the known register location prior to the first iteration of latency estimation. In some implementations, the bus master device writes a known value to the known register location prior to each iteration of latency estimation. In one example, the bus master device writes a different known value for each iteration of latency estimation.

The use of iterative latency estimation may be extended for use in determining fractional delay values. In one example, the iterative latency estimation for determining fractional delay values may be employed when no coarse delay is implemented or configured. In another example, the iterative latency estimation for determining fractional delay values may be employed after calculating a value for coarse delay, where the coarse delay value may be decremented prior to performing iterative latency estimation for the fractional delay.

In other examples, latency estimation is not used and a bus master device may configure coarse and/or fractional delay values using a lookup table and/or preconfigured registers. The lookup table and/or preconfigured registers may be populated with one or more sets of parameters during manufacture, system integration, initialization and/or during device configurations that may occur from time to time, including when one or more slave devices are coupled to the serial bus and become active on the serial bus. Different sets of parameters may be configured for different PVT conditions, bus protocols and/or for bus configuration and frequency.

Figure 16:
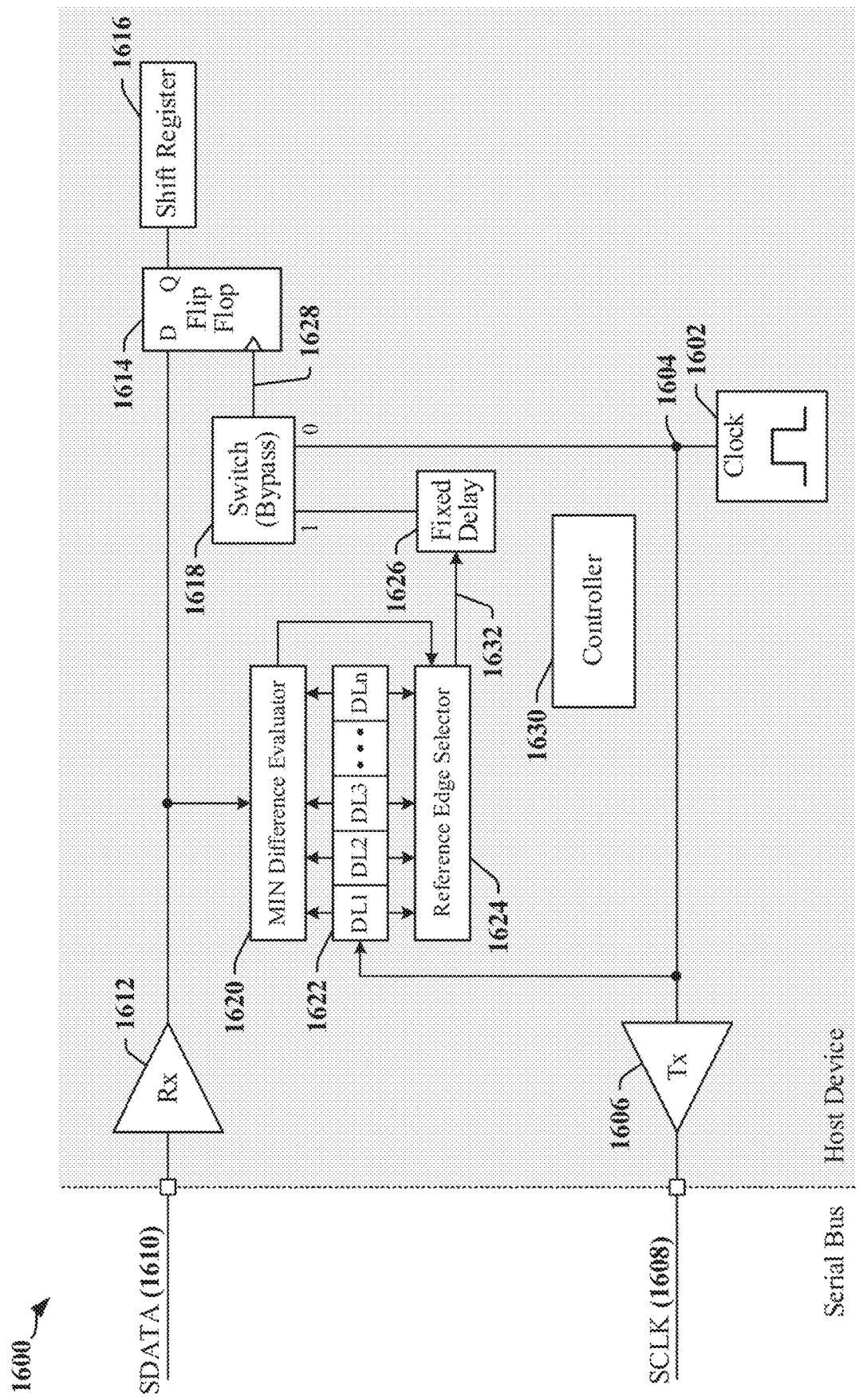
FIG. 16 illustrates a second example of a bus interface in a host device adapted according to certain aspects disclosed herein.

FIG. 16 illustrates a second example of a bus interface 1600 in a host device adapted according to certain aspects disclosed herein. The bus interface 1600 may couple the host device to a multi-drop serial bus. In the illustrated example, the serial bus includes a clock line (SCLK 1608) and a data line (SDATA 1610). In some instances, the serial bus includes multiple data lanes.

The host device includes a clock source 1602, which may be implemented using a clock generator, frequency divide or multiply circuits and/or other logic. The clock source 1602 provides a clock signal 1604 that is transmitted by a line driver 1606 on SCLK 1608 and that may be used to control the timing of data transmissions over the serial bus. The clock signal 1604 may be provided to a delay line 1622 that can be configured to select from multiple versions of the clock signal 1604, each version having a different delay with respect to the clock signal 1604 and with respect to each of the other versions of the clock signal 1604. In some instances, the delay line 1622 may be provided in a DLL circuit, or the like. The delay line 1622 provides delayed and non-delayed versions of the clock signal 1604 to a minimum difference evaluator 1620 and a reference edge selector 1624. The reference edge selector 1624 provides an output 1632 selected from the delayed and non-delayed versions of the clock signal 1604 provided by the delay line 1622. The clock signal 1604, or the non-delayed clock branch provided by the delay line 1622, may be transmitted over SCLK 1608 to external slave devices. The minimum difference evaluator 1620 may compare certain edges in SDATA 1610 to the delayed and non-delayed versions of the clock signal 1604 to select the version of the clock signal 1604 to be used to derive a sampling signal in the host device during slave read transactions. The minimum difference evaluator 1620 may be operated autonomously, whereby the minimum difference evaluator 1620 includes a controller and/or finite state machine that selects the version of the clock signal 1604 to be provided as the output 1632.

In some implementations, the output 1632 of the minimum difference evaluator 1620 may be provided to a delay element 1626 that is configured to optimize the sampling point to be used by the host device during slave read transactions. In one example, the delay element 1626 provides a fixed or preconfigured fractional delay. In another example, the delay element 1626 is configured with a preconfigured fractional delay during configuration procedures performed periodically, automatic configuration during every read command, upon detection of a change in latency, a change in PVT conditions, at system startup and/or under command of control software.

The bus interface 1600 may include a controller 1630 that configures certain components of the bus interface 1600, and/or that manages aspects of data transmission or reception. The controller 1630 may be implemented using a microprocessor, microcontroller and/or finite state machine. In one example, a line receiver 1612 coupled to SDATA 1610 provides a data signal to a flipflop 1614 that is clocked by a signal 1628 that is a version of the clock signal 1604. The signal 1628 may be provided by the reference edge selector 1624 (through the delay element 1626) or by the clock source 1602. In one example, the controller 1630 controls a switch 1618 that selects between the output of the delay element 1626 and the clock source 1602 to provide a signal that clocks the flipflop 1614. The flipflop 1614 provides a stream of data bits that may be captured in a shift register 1616.

Figure 17:
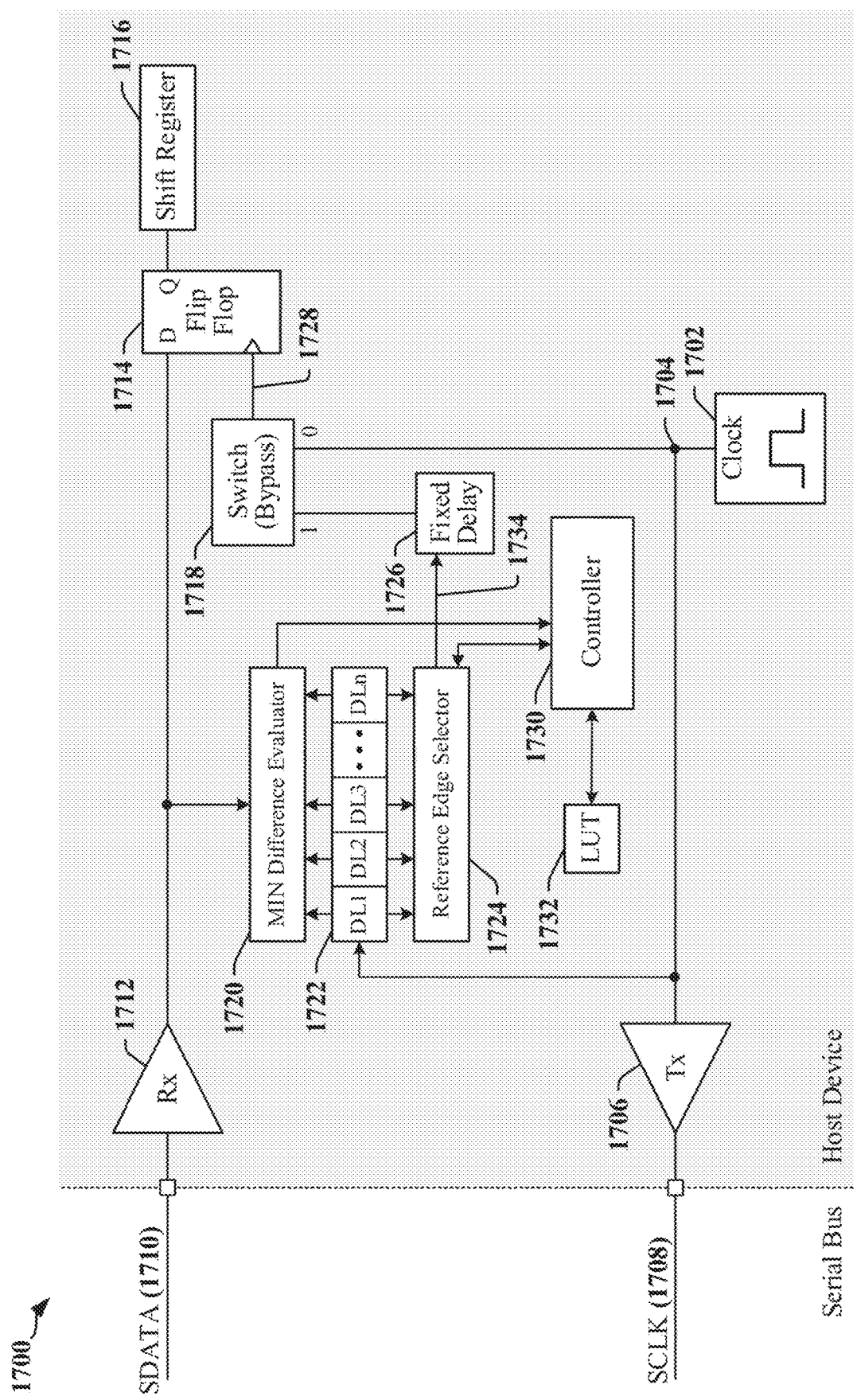
FIG. 17 illustrates a third example of a bus interface in a host device adapted according to certain aspects disclosed herein.

FIG. 17 illustrates a third example of a bus interface 1700 in a host device adapted according to certain aspects disclosed herein. The bus interface 1700 may couple the host device to a multi-drop serial bus. In the illustrated example, the serial bus includes a clock line (SCLK 1708) and a data line (SDATA 1710). In some instances, the serial bus includes multiple data lanes.

The host device includes a clock source 1702, which may be implemented using a clock generator, frequency divide or multiply circuits and/or other logic. The clock source 1702 provides a clock signal 1704 that is transmitted by a line driver 1706 on SCLK 1708 and that may be used to control the timing of data transmissions over the serial bus. The clock signal 1704 may be provided to a delay line 1722 that can be configured to select from multiple versions of the clock signal 1704, each version having a different delay with respect to the clock signal 1704 and with respect to each of the other versions of the clock signal 1704. In some instances, the delay line 1722 may be provided in a DLL circuit, or the like. The delay line 1722 provides delayed and non-delayed versions of the clock signal 1704 to a minimum difference evaluator 1720 and a reference edge selector 1724.

The bus interface 1700 may include a controller 1730 that configures certain components of the bus interface 1700, and/or that manages aspects of data transmission or reception. The controller 1730 may receive information from the minimum difference evaluator 1720 that can be used to select a suitable clock branch for matching delay observed during slave read transactions (see $T_D$ 642 in FIG. 6). The controller 1730 may control the reference edge selector 1724 such that it provides an output 1734 selected by the controller 1730 from the delayed and non-delayed versions of the clock signal 1704 provided by the delay line 1722. The clock signal 1704, or the non-delayed clock branch provided by the delay line 1722, may be transmitted over SCLK 1708 to external slave devices. The minimum difference evaluator 1720 may compare certain edges in SDATA 1710 to the delayed and non-delayed versions of the clock signal 1704. The minimum difference evaluator 1720 may include a controller and/or finite state machine that selects the version of the clock signal 1704 to be provided as the output 1734.

In some implementations, the output 1734 of the minimum difference evaluator 1720 may be provided to a delay element 1726 that is configured to optimize the sampling point to be used by the host device during slave read transactions. In one example, the delay element 1726 provides a fixed or preconfigured fractional delay. In another example, the delay element 1726 is configured with a preconfigured fractional delay during configuration procedures performed periodically, automatic configuration during every read command, upon detection of a change in latency, a change in PVT conditions, at system startup and/or under command of control software.

The controller 1730 may be implemented using a microprocessor, microcontroller and/or finite state machine. The controller 1730 may maintain or have access to a look-up table (LUT 1732) that may be used to derive the delay value used for generating a sampling signal from a delayed version of the clock signal 1704. In one example, a line receiver 1712 coupled to SDATA 1710 provides a data signal to a flipflop 1714 that is clocked by a signal 1728 that is a version of the clock signal 1704. The signal 1728 may be provided by the reference edge selector 1724 (through the delay element 1726) or by the clock source 1702. In one example, the controller 1730 controls a switch 1718 that selects between the output of the delay element 1726 and the clock source 1702 to provide a signal that clocks the flipflop 1714. The flipflop 1714 provides a stream of data bits that may be captured in a shift register 1716.

The LUT 1732 may be configured with one or more delay values for each slave device known to the host device. The delay values may be used by the controller 1730 to configure the switch 1718 and the delay line 1722 for each transaction and/or to provide automatic delay adjustment. The LUT 1732 may be configured during manufacture, system integration and/or initialization. The delay values may be obtained from characterization of the host and slave devices and/or the serial bus. In some instances, the LUT 1732 may be configured or reconfigured in a calibration procedure. In certain implementations, delay values may be selected based on current PVT conditions.

Figure 18:
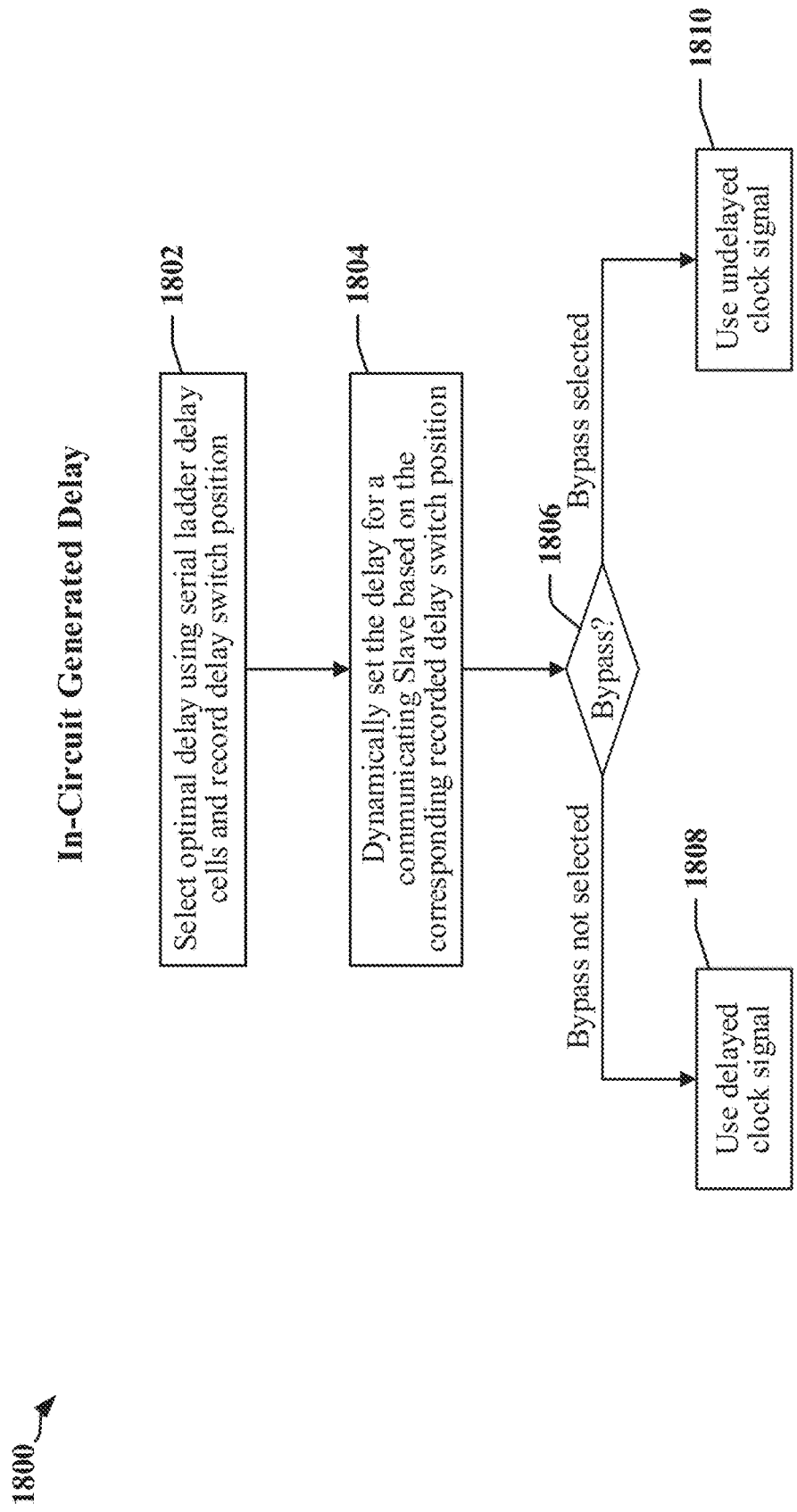
FIG. 18 is a flowchart illustrating certain aspects of a bus interface that can automatically determine a delay used to derive a sampling signal for sampling a data signal in accordance with certain aspects disclosed herein.

FIG. 18 is a flowchart 1800 illustrating certain aspects of a bus interface 1600, 1700 that can automatically determine a delay used to derive a sampling signal for sampling a data signal in accordance with certain aspects disclosed herein. The bus interface 1700 may include a controller that manages or performs at least part of a delay calibration procedure or method. At block 1802, a calibrated or optimal delay may be selected. The delay may be selected using a delay ladder or delay line. In one example, the reference edge selector may include a switch that selects between delayed and non-delayed versions of the clock signal 1704. The reference edge selector may be configured using a parameter that may be referred to as a delay switch position. A current delay switch position may be automatically configured and/or configured using a lookup table.

At block 1804, the current delay switch position may be applied to cause the reference edge selector 1724 to provide an output used to derive the sampling signal. At block 1806, the controller 1730 may determine whether a bypass is to be selected. A bypass may be selected when the clock signal is to be used without a delay at block 1810. A bypass is not selected when the clock signal is to be used with a delay at block 1808.

Examples of Processing Circuits and Methods

Figure 19:
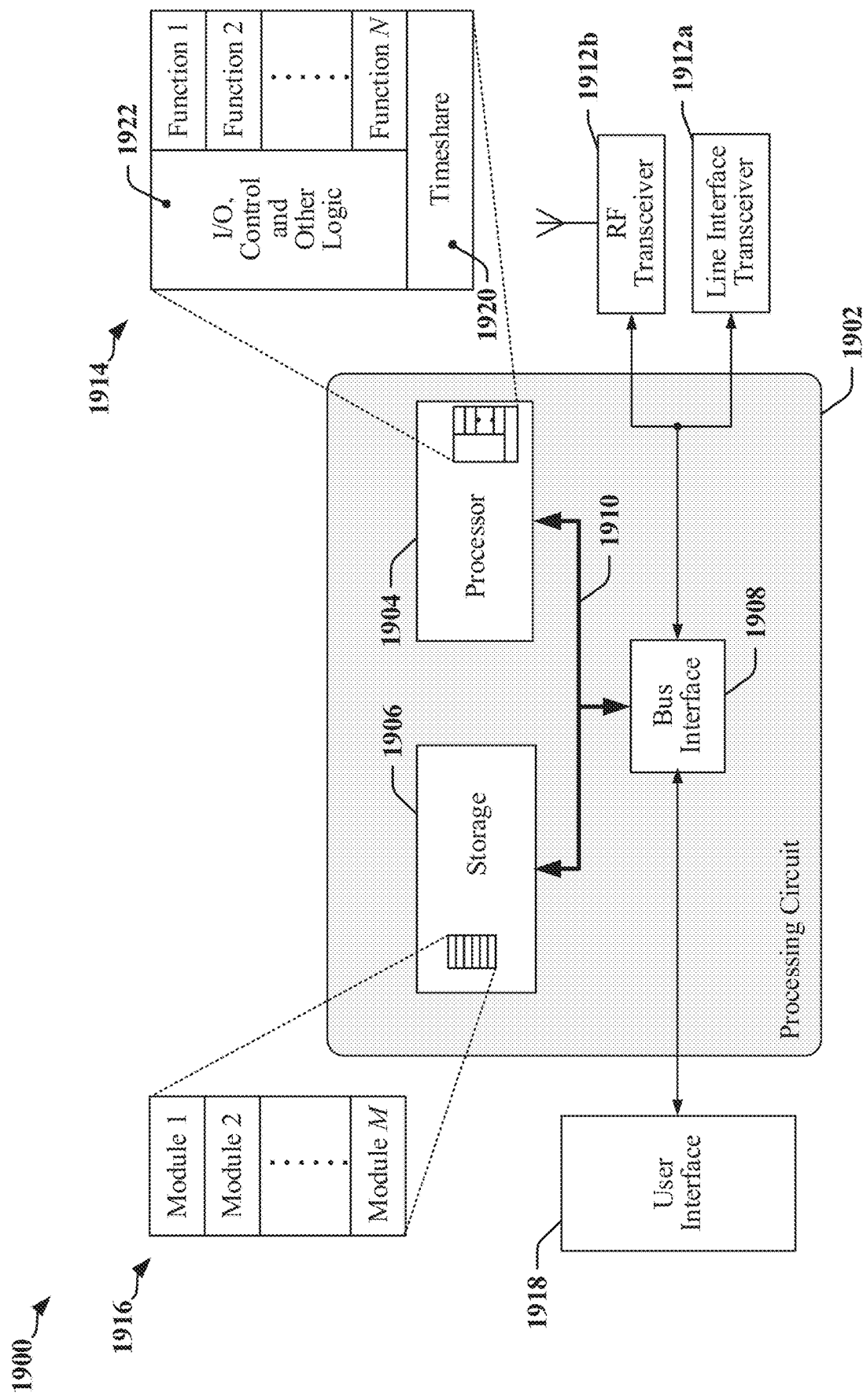
FIG. 19 illustrates one example of an apparatus employing a processing circuit that may be adapted according to certain aspects disclosed herein.

FIG. 19 is a diagram illustrating an example of a hardware implementation for an apparatus 1900. In some examples, the apparatus 1900 may perform one or more functions disclosed herein. In accordance with various aspects of the disclosure, an element, or any portion of an element, or any combination of elements as disclosed herein may be implemented using a processing circuit 1902. The processing circuit 1902 may include one or more processors 1904 that are controlled by some combination of hardware and software modules. Examples of processors 1904 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1904 may include specialized processors that perform specific functions, and that may be configured, augmented or controlled by one of the software modules 1916. The one or more processors 1904 may be configured through a combination of software modules 1916 loaded during initialization, and further configured by loading or unloading one or more software modules 1916 during operation.

In the illustrated example, the processing circuit 1902 may be implemented with a bus architecture, represented generally by the bus 1910. The bus 1910 may include any number of interconnecting buses and bridges depending on the specific application of the processing circuit 1902 and the overall design constraints. The bus 1910 links together various circuits including the one or more processors 1904, and storage 1906. Storage 1906 may include memory devices and mass storage devices, and may be referred to herein as computer-readable media and/or processor-readable media. The bus 1910 may also link various other circuits such as timing sources, timers, peripherals, voltage regulators, and power management circuits. A bus interface 1908 may provide an interface between the bus 1910 and one or more transceivers 1912*a*, 1912*b*. A transceiver 1912*a*, 1912*b* may be provided for each networking technology supported by the processing circuit. In some instances, multiple networking technologies may share some or all of the circuitry or processing modules found in a transceiver 1912*a*, 1912*b*. Each transceiver 1912*a*, 1912*b* provides a means for communicating with various other apparatus over a transmission medium. In one example, a transceiver 1912*a* may be used to couple the apparatus 1900 to a multi-wire bus. In another example, a transceiver 1912*b* may be used to connect the apparatus 1900 to a radio access network. Depending upon the nature of the apparatus 1900, a user interface 1918 (e.g., keypad, display, speaker, microphone, joystick) may also be provided, and may be communicatively coupled to the bus 1910 directly or through the bus interface 1908.

A processor 1904 may be responsible for managing the bus 1910 and for general processing that may include the execution of software stored in a computer-readable medium that may include the storage 1906. In this respect, the processing circuit 1902, including the processor 1904, may be used to implement any of the methods, functions and techniques disclosed herein. The storage 1906 may be used for storing data that is manipulated by the processor 1904 when executing software, and the software may be configured to implement any one of the methods disclosed herein.

One or more processors 1904 in the processing circuit 1902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1906 or in an external computer-readable medium. The external computer-readable medium and/or storage 1906 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1906 may also include, by way of example, a carrier wave, a transmission line, and any other suitable medium for transmitting software and/or instructions that may be accessed and read by a computer. Computer-readable medium and/or the storage 1906 may reside in the processing circuit 1902, in the processor 1904, external to the processing circuit 1902, or be distributed across multiple entities including the processing circuit 1902. The computer-readable medium and/or storage 1906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1906 may maintain software maintained and/or organized in loadable code segments, modules, applications, programs, etc., which may be referred to herein as software modules 1916. Each of the software modules 1916 may include instructions and data that, when installed or loaded on the processing circuit 1902 and executed by the one or more processors 1904, contribute to a run-time image 1914 that controls the operation of the one or more processors 1904. When executed, certain instructions may cause the processing circuit 1902 to perform functions in accordance with certain methods, algorithms and processes described herein.

Some of the software modules 1916 may be loaded during initialization of the processing circuit 1902, and these software modules 1916 may configure the processing circuit 1902 to enable performance of the various functions disclosed herein. For example, some software modules 1916 may configure internal devices and/or logic circuits 1922 of the processor 1904, and may manage access to external devices such as a transceiver 1912*a*, 1912*b*, the bus interface 1908, the user interface 1918, timers, mathematical coprocessors, and so on. The software modules 1916 may include a control program and/or an operating system that interacts with interrupt handlers and device drivers, and that controls access to various resources provided by the processing circuit 1902. The resources may include memory, processing time, access to a transceiver 1912*a*, 1912*b*, the user interface 1918, and so on.

One or more processors 1904 of the processing circuit 1902 may be multifunctional, whereby some of the software modules 1916 are loaded and configured to perform different functions or different instances of the same function. The one or more processors 1904 may additionally be adapted to manage background tasks initiated in response to inputs from the user interface 1918, the transceiver 1912*a*, 1912*b*, and device drivers, for example. To support the performance of multiple functions, the one or more processors 1904 may be configured to provide a multitasking environment, whereby each of a plurality of functions is implemented as a set of tasks serviced by the one or more processors 1904 as needed or desired. In one example, the multitasking environment may be implemented using a timesharing program 1920 that passes control of a processor 1904 between different tasks, whereby each task returns control of the one or more processors 1904 to the timesharing program 1920 upon completion of any outstanding operations and/or in response to an input such as an interrupt. When a task has control of the one or more processors 1904, the processing circuit is effectively specialized for the purposes addressed by the function associated with the controlling task. The timesharing program 1920 may include an operating system, a main loop that transfers control on a round-robin basis, a function that allocates control of the one or more processors 1904 in accordance with a prioritization of the functions, and/or an interrupt driven main loop that responds to external events by providing control of the one or more processors 1904 to a handling function.

Figure 20:
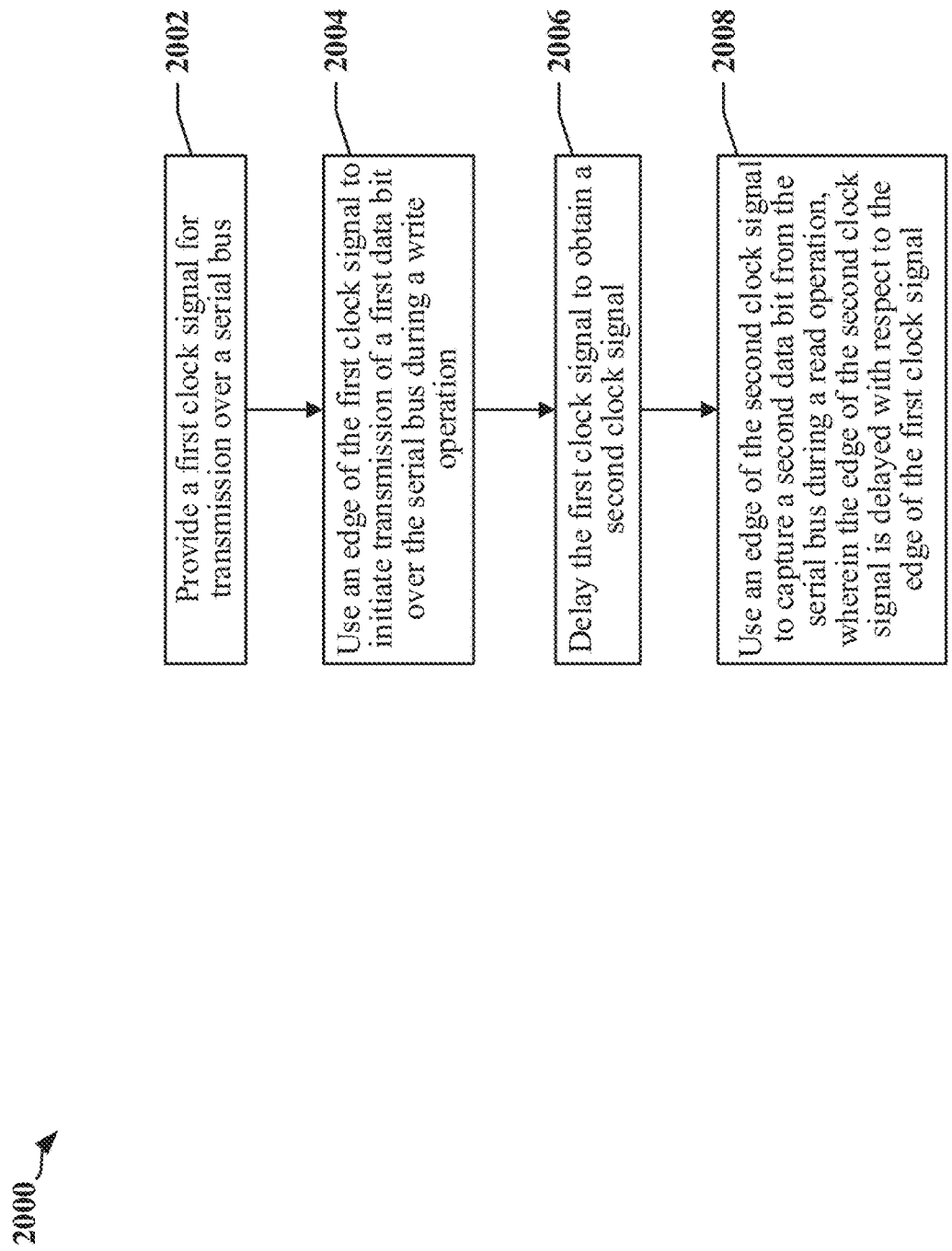
FIG. 20 is a flowchart that illustrates the use of configurable delays during read transactions in accordance with certain aspects disclosed herein.

FIG. 20 is a flowchart 2000 of a method that may be performed by a device coupled to a serial bus. The serial bus may be operated in accordance with an I2C, I3C, RFFE, SPMI or other protocol. At block 2002, the device may provide a first clock signal for transmission over a serial bus. At block 2004, the device may use an edge of the first clock signal to initiate transmission of a first data bit over the serial bus during a write operation. At block 2006, the device may delay the first clock signal to obtain a second clock signal. At block 2008, the device may use an edge of the second clock signal to capture a second data bit from the serial bus during a read operation. The edge of the second clock signal may be delayed with respect to the edge of the first clock signal.

In certain examples, the first clock signal may be delayed by configuring a delay between the edge of the first clock signal and the edge of the second clock signal to accommodate latencies associated with transmission of data bits by a slave device during the read operation, the latencies including one or more latencies associated with a propagation delay. The delay between the edge of the first clock signal and the edge of the second clock signal may include a coarse delay including one or more half-cycles of the first clock signal. The delay between the edge of the first clock signal and the edge of the second clock signal may include a fractional delay having a duration that is less than one cycle of the first clock signal.

In some examples, the first clock signal may be delayed by determining an operating condition affecting transmissions over the serial bus and configuring a delay circuit based on the operating condition. The operating condition may relate to a process variable, an operating voltage or an operating temperature.

In some examples, the first clock signal may be delayed by determining an operating condition affecting transmissions over the serial bus, using the operating condition to select a delay value from a lookup table, and using the delay value to configure a delay circuit that provides the second clock signal. The lookup table may maintain delay values for a plurality of different operating conditions. The delay values maintained by the lookup table may be derived from a characterization of one or more transmission paths between two devices participating in the read operation.

In certain examples, a read delay may be determined based on a time elapsed between one or more edges in the first clock signal and corresponding transitions in a data signal received from a slave device. A delay circuit may be configured to accommodate the read delay. The delay circuit may delay the first clock signal to obtain a second clock signal. The read delay may be determined by transmitting a read command, and measuring time elapsed between end of transmission of the read command and an acknowledgement signaled by the slave device responsive to the read command.

Figure 21:
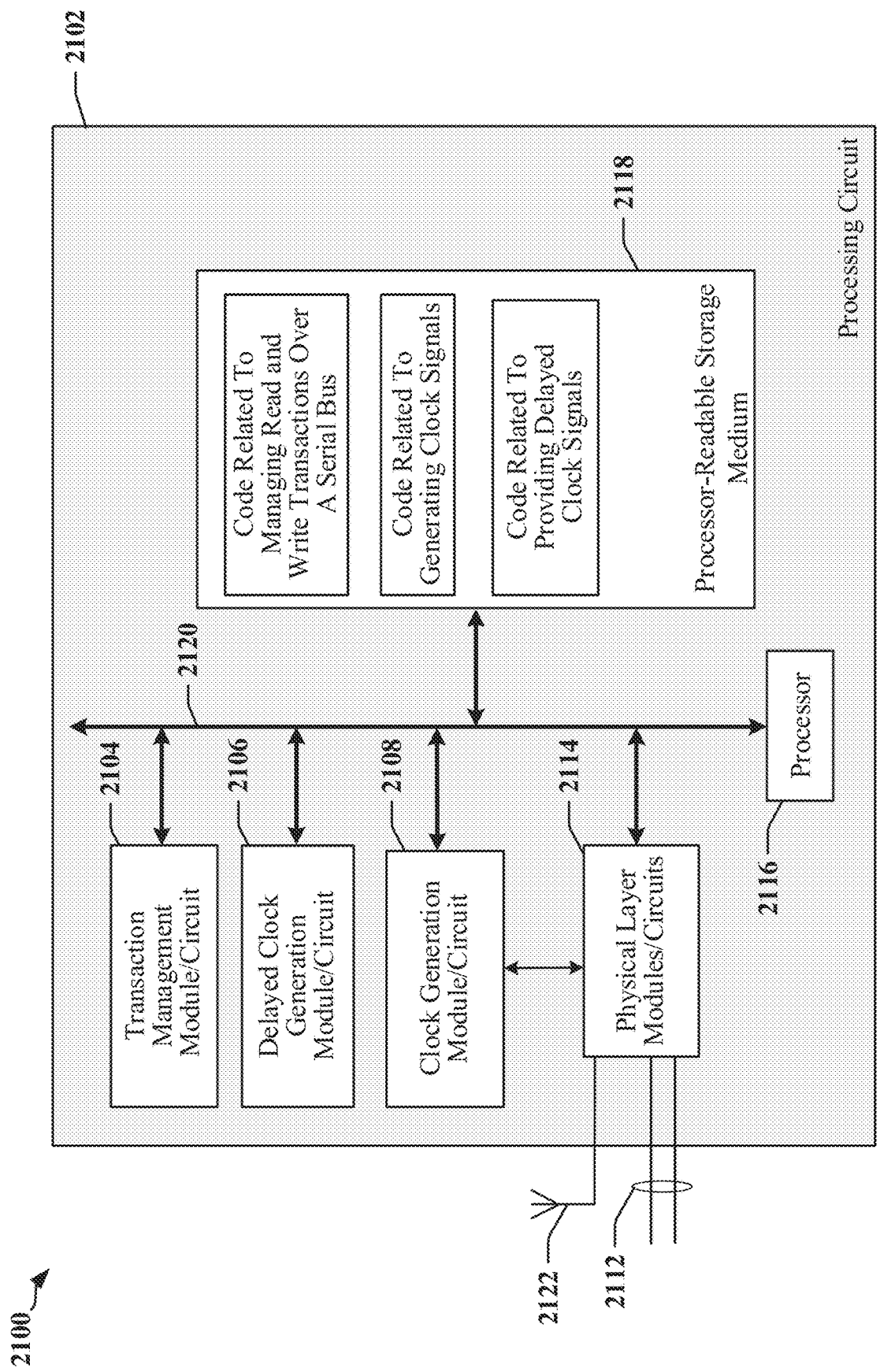
FIG. 21 illustrates an example of a hardware implementation for an apparatus adapted in accordance with certain aspects disclosed herein.

FIG. 21 is a diagram illustrating a simplified example of a hardware implementation for an apparatus 2100 employing a processing circuit 2102. The processing circuit typically has a controller or processor 2116 that may include one or more microprocessors, microcontrollers, digital signal processors, sequencers and/or state machines. The processing circuit 2102 may be implemented with a bus architecture, represented generally by the bus 2120. The bus 2120 may include any number of interconnecting buses and bridges depending on the specific application of the processing circuit 2102 and the overall design constraints. The bus 2120 links together various circuits including one or more processors and/or hardware modules, represented by the controller or processor 2116, the modules or circuits 2104, 2106 and 2108, and the processor-readable storage medium 2118. One or more physical layer circuits and/or modules 2114 may be provided to support communications over a communication link implemented using a multi-drop serial bus 2112, through an antenna 2122 (to a radio access network for example), and so on. The bus 2120 may also link various other circuits such as timing sources, peripherals, voltage regulators, and power management circuits, which are well known in the art, and therefore, will not be described any further.

The processor 2116 is responsible for general processing, including the execution of software, code and/or instructions stored on the processor-readable storage medium 2118. The processor-readable storage medium may include a non-transitory storage medium. The software, when executed by the processor 2116, causes the processing circuit 2102 to perform the various functions described supra for any particular apparatus. The processor-readable storage medium may be used for storing data that is manipulated by the processor 2116 when executing software. The processing circuit 2102 further includes at least one of the modules 2104, 2106 and 2108. The modules 2104, 2106 and 2108 may be software modules running in the processor 2116, resident/stored in the processor-readable storage medium 2118, one or more hardware modules coupled to the processor 2116, or some combination thereof. The modules 2104, 2106 and 2108 may include microcontroller instructions, state machine configuration parameters, or some combination thereof.

In one configuration, the apparatus 2100 may be a data communication apparatus that includes modules and/or circuits 2104 adapted to manage transactions over the multi-drop serial bus 2112. The transactions may include write operations and read operations from the perspective of the apparatus 2100, where the apparatus 2100 is a host device or bus master device. The apparatus 2100 may include modules and/or circuits 2108 adapted to generate one or more clock signals, including a first clock signal transmitted over the multi-drop serial bus 2112 to control timing of data transmissions. The apparatus 2100 may include modules and/or circuits 2106 adapted to generate a second clock signal that is a delayed version of the first clock signal. In one example, the modules and/or circuits 2106 include a programmable delay circuit that is configurable by the processor 2116.

In one example, the physical layer circuits and/or modules 2114 of the apparatus 2100 implement an interface circuit adapted to couple the apparatus 2100 to the multi-drop serial bus 2112. The multi-drop serial bus 2112 may be operated in accordance with an I2C, I3C, RFFE, SPMI or other protocol. The apparatus 2100 may have a clock generator configured to provide a first clock signal for transmission over the multi-drop serial bus 2112 by the interface circuit, a delay circuit that is adapted to generate the second clock signal by delaying the first clock signal, and a controller such as the processor 2116. The controller may be configured to cause the interface circuit to use an edge of the first clock signal to initiate transmission of a first data bit over the serial bus during a write operation, and cause the interface circuit to use an edge of the second clock signal to capture a second data bit from the serial bus during a read operation. The edge of the second clock signal may be delayed with respect to the edge of the first clock signal.

In certain examples, the delay circuit is configured to configure a delay between the edge of the first clock signal and the edge of the second clock signal to accommodate latencies associated with transmission of data bits by a slave device during the read operation, the latencies including one or more latencies associated with a propagation delay. The delay between the edge of the first clock signal and the edge of the second clock signal may include a coarse delay including one or more half-cycles of the first clock signal. The delay between the edge of the first clock signal and the edge of the second clock signal may include a fractional delay having a duration that is less than one cycle of the first clock signal.

In certain examples, the controller is further configured to determine an operating condition affecting transmissions over the serial bus, and configure the delay circuit based on the operating condition. The operating condition may relate to a process variable, an operating voltage or an operating temperature.

In certain examples, the controller is further configured to determine an operating condition affecting transmissions over the serial bus, use the operating condition to select a delay value from a lookup table, and use the delay value to configure the delay circuit. The lookup table may maintain delay values for a plurality of different operating conditions. The delay values maintained by the lookup table may be derived from a characterization of one or more transmission paths between two devices participating in the read operation.

In certain examples, the controller is further configured to determine a read delay based on a time elapsed between one or more edges in the first clock signal and corresponding transitions in a data signal received from a slave device, and configure the delay circuit to accommodate the read delay. The controller may be further configured to transmit a read command, and measure time elapsed between end of transmission of the read command and an acknowledgement signaled by the slave device responsive to the read command.

In another example, the processor-readable storage medium 2118 may store or maintain code for providing a first clock signal for transmission over a serial bus, using an edge of the first clock signal to initiate transmission of a first data bit over the serial bus during a write operation, delaying the first clock signal to obtain a second clock signal, and using an edge of the second clock signal to capture a second data bit from the serial bus during a read operation. The edge of the second clock signal may be delayed with respect to the edge of the first clock signal.

The processor-readable storage medium 2118 may store or maintain code for configuring a delay between the edge of the first clock signal and the edge of the second clock signal to accommodate latencies associated with transmission of data bits by a slave device during the read operation (see $T_D$ 642 in FIG. 6, for example), the latencies including one or more latencies associated with a propagation delay. The delay between the edge of the first clock signal and the edge of the second clock signal includes a coarse delay including one or more half-cycles of the first clock signal. The delay between the edge of the first clock signal and the edge of the second clock signal includes a fractional delay having a duration that is less than one cycle of the first clock signal.

The processor-readable storage medium 2118 may store or maintain code for determining an operating condition affecting transmissions over the serial bus, and configuring a delay circuit based on the operating condition. The operating condition may relate to a process variable, an operating voltage or an operating temperature.

The processor-readable storage medium 2118 may store or maintain code for determining an operating condition affecting transmissions over the serial bus, using the operating condition to select a delay value from a lookup table, and using the delay value to configure a delay circuit that provides the second clock signal. The lookup table maintains delay values for a plurality of different operating conditions.

The delay values maintained by the lookup table may be derived from a characterization of one or more transmission paths between two devices participating in the read operation.

The processor-readable storage medium 2118 may store or maintain code for determining a read delay based on a time elapsed between one or more edges in the first clock signal and corresponding transitions in a data signal received from a slave device, and configuring a delay circuit to accommodate the read delay. The delay circuit may delay the first clock signal to obtain a second clock signal. The processor-readable storage medium 2118 may store or maintain code for transmitting a read command, and measuring time elapsed between end of transmission of the read command and an acknowledgement signaled by the slave device responsive to the read command.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communications, comprising:
   providing a first clock signal for transmission over a serial bus;
   delaying the first clock signal to obtain a second clock signal, wherein a delay is provided between an edge of the first clock signal and an edge of the second clock signal to accommodate latencies associated with transmission of data bits by a slave device during a read operation, the latencies including one or more latencies associated with a propagation delay;
   using the edge of the first clock signal to initiate transmission of a first data bit over the serial bus during a write operation; and
   using the edge of the second clock signal to capture a second data bit from the serial bus during the read operation.

2. The method of claim 1, wherein the delay between the edge of the first clock signal and the edge of the second clock signal includes a coarse delay comprising one or more half-cycles of the first clock signal.

3. The method of claim 1, wherein the delay between the edge of the first clock signal and the edge of the second clock signal includes a fractional delay having a duration that is less than one cycle of the first clock signal.

4. The method of claim 1, wherein delaying the first clock signal comprises:
   determining an operating condition affecting transmissions over the serial bus; and
   configuring a delay circuit based on the operating condition.

5. The method of claim 4, wherein the operating condition relates to a process variable, an operating voltage or an operating temperature.

6. The method of claim 1, wherein delaying the first clock signal comprises:
   determining an operating condition affecting transmissions over the serial bus;
   using the operating condition to select a delay value from a lookup table, wherein the lookup table maintains one or more delay values for a plurality of different operating conditions; and
   using the delay value to configure a delay circuit that provides the second clock signal.

7. The method of claim 6, wherein the one or more delay values maintained by the lookup table are derived from a characterization of one or more transmission paths between two devices participating in the read operation.

8. The method of claim 1, further comprising:
   determining a read delay based on a time elapsed between one or more edges in the first clock signal and corresponding transitions in a data signal received from the slave device; and
   configuring a delay circuit to accommodate the read delay, wherein the delay circuit delays the first clock signal to obtain the second clock signal.

9. The method of claim 8, wherein determining the read delay comprises:
   transmitting a read command; and
   measuring time elapsed between end of transmission of the read command and an acknowledgement signaled by the slave device responsive to the read command.

10. The method of claim 1, wherein the serial bus is operated in accordance with a System Power Management Interface protocol, a Radio Frequency Front-End protocol, an Inter-Integrated Circuit (I2C) protocol or an I3C protocol.

11. A data communication apparatus comprising:
   an interface circuit configured to couple the data communication apparatus to a serial bus;
   a clock generator configured to provide a first clock signal for transmission over the serial bus by the interface circuit;
   a delay circuit that is configured to:
      generate a second clock signal by delaying the first clock signal, wherein a delay is provided between an edge of the first clock signal and an edge of the second clock signal to accommodate latencies associated with transmission of data bits by a slave device during a read operation, the latencies including one or more latencies associated with a propagation delay; and
   a controller configured to:
      cause the interface circuit to use the edge of the first clock signal to initiate transmission of a first data bit over the serial bus during a write operation; and
      cause the interface circuit to use the edge of the second clock signal to capture a second data bit from the serial bus during the read operation.

12. The data communication apparatus of claim 11, wherein the delay between the edge of the first clock signal and the edge of the second clock signal includes a coarse delay comprising one or more half-cycles of the first clock signal.

13. The data communication apparatus of claim 11, wherein the delay between the edge of the first clock signal and the edge of the second clock signal includes a fractional delay having a duration that is less than one cycle of the first clock signal.

14. The data communication apparatus of claim 11, wherein the controller is further configured to:
determine an operating condition affecting transmissions over the serial bus; and
configure the delay circuit based on the operating condition.

15. The data communication apparatus of claim 14, wherein the operating condition relates to a process variable, an operating voltage or an operating temperature.

16. The data communication apparatus of claim 11, wherein the controller is further configured to:
determine an operating condition affecting transmissions over the serial bus;
use the operating condition to select a delay value from a lookup table, wherein the lookup table maintains one or more delay values for a plurality of different operating conditions; and
use the delay value to configure the delay circuit.

17. The data communication apparatus of claim 16, wherein the one or more delay values maintained by the lookup table are derived from a characterization of one or more transmission paths between two devices participating in the read operation.

18. The data communication apparatus of claim 11, wherein the controller is further configured to:
determine a read delay based on a time elapsed between one or more edges in the first clock signal and corresponding transitions in a data signal received from the slave device; and
configure the delay circuit to accommodate the read delay.

19. The data communication apparatus of claim 18, wherein the controller is further configured to:
transmit a read command; and
measure time elapsed between end of transmission of the read command and an acknowledgement signaled by the slave device responsive to the read command.

20. The data communication apparatus of claim 11, wherein the serial bus is operated in accordance with a System Power Management Interface protocol, a Radio Frequency Front-End protocol, an Inter-Integrated Circuit (I2C) protocol or an I3C protocol.

21. A non-transitory processor-readable storage medium comprising code for:
providing a first clock signal for transmission over a serial bus;
delaying the first clock signal to obtain a second clock signal, wherein a delay is provided between an edge of the first clock signal and an edge of the second clock signal to accommodate latencies associated with transmission of data bits by a slave device during a read operation, the latencies including one or more latencies associated with a propagation delay;
using the edge of the first clock signal to initiate transmission of a first data bit over the serial bus during a write operation; and
using the edge of the second clock signal to capture a second data bit from the serial bus during the read operation.

22. The storage medium of claim 21, further comprising code for:
configuring the delay between the edge of the first clock signal and the edge of the second clock signal, wherein the delay between the edge of the first clock signal and the edge of the second clock signal includes a coarse delay comprising one or more half-cycles of the first clock signal.

23. The storage medium of claim 21, further comprising code for:
configuring the delay between the edge of the first clock signal and the edge of the second clock signal, wherein the delay between the edge of the first clock signal and the edge of the second clock signal includes a fractional delay having a duration that is less than one cycle of the first clock signal.

24. The storage medium of claim 21, further comprising code for:
determining an operating condition affecting transmissions over the serial bus;
using the operating condition to select a delay value from a lookup table, wherein the lookup table maintains one or more delay values for a plurality of different operating conditions; and
using the delay value to configure a delay circuit that provides the second clock signal, wherein the one or more delay values maintained by the lookup table are derived from a characterization of one or more transmission paths between two devices participating in the read operation.

25. The storage medium of claim 21, further comprising code for:
determining a read delay based on a time elapsed between one or more edges in the first clock signal and corresponding transitions in a data signal received from the slave device; and
configuring a delay circuit to accommodate the read delay, wherein the delay circuit delays the first clock signal to obtain the second clock signal.

26. The storage medium of claim 25, further comprising code for:
transmitting a read command; and
measuring time elapsed between end of transmission of the read command and an acknowledgement signaled by the slave device responsive to the read command.

27. An apparatus coupled to a serial bus, comprising:
means for providing a first clock signal for transmission over the serial bus;
means for delaying the first clock signal to obtain a second clock signal, configured to provide a delay between an edge of the first clock signal and an edge of the second clock signal to accommodate latencies associated with transmission of data bits by a slave device during a read operation, the latencies including one or more latencies associated with a propagation delay; and
means for initiating transmission of data over the serial bus, configured to:
use the edge of the first clock signal to initiate transmission of a first data bit over the serial bus during a write operation; and
use the edge of the second clock signal to capture a second data bit from the serial bus during the read operation.

28. The apparatus of claim 27, further comprising:
means for transmitting a read command; and
means for measuring time elapsed between end of transmission of the read command and an acknowledgement signaled by the slave device responsive to the read command.

* * * * *